(12) United States Patent
Xu et al.

(10) Patent No.: US 11,343,030 B2
(45) Date of Patent: May 24, 2022

(54) METHOD FOR REPEATED TRANSMISSION, AND TERMINAL DEVICE

(71) Applicant: Huawei Technologies Co., Ltd., Shenzhen (CN)

(72) Inventors: Xiuqiang Xu, Shanghai (CN); Yiqun Wu, Shanghai (CN); Yan Chen, Shanghai (CN); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/729,287

(22) Filed: Dec. 27, 2019

(65) Prior Publication Data

US 2020/0136766 A1    Apr. 30, 2020

Related U.S. Application Data

(63) Continuation of application No. PCT/CN2018/093388, filed on Jun. 28, 2018.

(30) Foreign Application Priority Data

| Jun. 28, 2017 | (CN) | 201710512296.9 |
| Aug. 7, 2017 | (CN) | 201710667487.2 |
| Nov. 27, 2017 | (CN) | 201711209549.1 |

(51) Int. Cl.
*H04W 24/10* (2009.01)
*H04L 1/18* (2006.01)
(Continued)

(52) U.S. Cl.
CPC .......... *H04L 1/1896* (2013.01); *H04L 1/0003* (2013.01); *H04L 1/1819* (2013.01); *H04W 72/0446* (2013.01)

(58) Field of Classification Search
CPC ... H04L 5/0053; H04L 5/0055; H04L 1/1812; H04L 1/1861; H04L 1/1887;
(Continued)

(56) References Cited

U.S. PATENT DOCUMENTS 10,382,169 B2 *  8/2019  Cao ........................ H04L 1/0079
10,887,898 B2 *  1/2021  Au ......................... H04L 1/1812
(Continued)

FOREIGN PATENT DOCUMENTS

| CN | 102160318 A | 8/2011 |
| CN | 106411477 A | 2/2017 |

(Continued)

OTHER PUBLICATIONS

"On Adaptive HARQ for UL URLLC," 3GPP TSG RAN WG1, Meeting #88bis, Spokane, USA, R1-1705523, XP051243652, 3rd Generation Partnership Project, Valbonne, France (Apr. 3-7, 2017).

(Continued)

*Primary Examiner* — Phuc H Tran
(74) *Attorney, Agent, or Firm* — Leydig, Voit & Mayer, Ltd.

(57) ABSTRACT

This application discloses a method for repeated transmission and a terminal device. The method implemented by a terminal device includes: determining a transmission time unit used in the first transmission of to-be-transmitted data; determining, by the terminal device based on the determined transmission time unit and a parameter Q, a hybrid automatic repeat request HARQ process used to transmit the to-be-transmitted data, where Q is an integer greater than or equal to 1; and when repeated transmission of the to-be-transmitted data is not terminated before the first specific transmission time unit, performing, starting from the determined transmission unit, one transmission of the to-be-transmitted data in each transmission time unit by using the (Continued)

HARQ process until the last transmission of the to-be-transmitted data is performed in the first specific transmission time unit, where a period of the specific transmission time unit in a time domain resource is Q transmission time units.

18 Claims, 15 Drawing Sheets

(51) Int. Cl.
*H04L 1/00* (2006.01)
*H04W 72/04* (2009.01)

(58) Field of Classification Search
CPC ... H04L 1/1896; H04L 5/0048; H04L 1/1854; H04L 1/1671; H04L 5/0007; H04L 5/0091; H04L 1/1819; H04L 1/1822; H04L 5/0044; H04L 5/0051; H04L 1/189; H04L 5/14; H04L 1/00; H04L 1/0009; H04L 1/0027; H04L 1/0031; H04L 1/1825; H04L 27/26; H04L 5/0028; H04L 5/0032; H04L 67/12; H04L 12/189; H04L 1/0026; H04L 1/0038; H04L 1/1642; H04L 1/1858; H04L 2001/0093; H04L 25/0226; H04L 27/2601; H04L 27/2607; H04L 29/06231; H04L 41/0233; H04L 41/0816; H04L 5/005; H04L 5/0082
See application file for complete search history.

(56) References Cited

U.S. PATENT DOCUMENTS

| | | |
|---|---|---|
| 2010/0017671 A1 | 1/2010 | Cai et al. |
| 2016/0234800 A1 | 8/2016 | Jung et al. |
| 2018/0069666 A1 | 3/2018 | Wang |
| 2018/0176945 A1 | 6/2018 | Cao et al. |
| 2020/0037314 A1 | 1/2020 | Xiong et al. |
| 2020/0169903 A1* | 5/2020 | Takeda .............. H04W 72/0413 |

FOREIGN PATENT DOCUMENTS

| | | |
|---|---|---|
| EP | 3113559 A1 | 1/2017 |
| EP | 3552426 A1 | 10/2019 |
| EP | 3646507 A1 | 5/2020 |
| WO | 2016145576 A1 | 9/2016 |

OTHER PUBLICATIONS

"3rd Generation Partnership Project; Technical Specification Group Radio Access Network; NR; Medium Access Control (MAC) protocol specification (Release 15)," 3GPP TS 38.321 V0.0.3, pp. 1-20, 3rd Generation Partnership Project, Valbonne, France (May 2017).
"3rd Generation Partnership Project; Technical Specification Group Radio Access Network; NR; Radio Resource Control (RRC); Protocol specification (Release 15)," 3GPP TS 38.331 V0.0.4, pp. 1-22, 3rd Generation Partnership Project, Valbonne, France (Jun. 2017).
ZTE, "HARQ for URLLC UL Grant-free transmission," 3GPP TSG RAN WG1 Meeting #89, Hangzhou, P.R. China R1-1707166, total 6 pages, 3rd Generation Partnership Project, Valbonne, France (May 15-19, 2017).

* cited by examiner

| Grant-free resource | | RV x1 | RV x2 | RV x3 | RV x4 | RV x5 | RV x6 | | |
|---|---|---|---|---|---|---|---|---|---|
| | Slot | n | n+1 | n+2 | n+3 | n+4 | n+5 | n+6 | n+7 |

METHOD FOR REPEATED TRANSMISSION, AND TERMINAL DEVICE

CROSS-REFERENCE TO RELATED APPLICATIONS

This application is a continuation of International Application No. PCT/CN2018/093388, filed on Jun. 28, 2018, which claims priority to Chinese Patent Application No. 201710512296.9, filed on Jun. 28, 2017 and Chinese Patent Application No. 201710667487.2, filed on Aug. 7, 2017 and Chinese Patent Application No. 201711209549.1, filed on Nov. 27, 2017. The disclosures of the aforementioned applications are hereby incorporated by reference in their entireties

TECHNICAL FIELD

Embodiments of the present invention relate to the wireless communications field, and in particular, to a method for repeated transmission and a terminal device.

BACKGROUND

An ultra-reliable and low latency communications (URLLC) scenario is one of application scenarios in 5G communication. In URLLC, both data transmission reliability and a low-latency feature need to be satisfied. To satisfy a requirement for a low latency, a grant-free transmission mechanism is proposed and becomes a technology in 5G communication. In the grant-free transmission mechanism, when new data arrives, a terminal device does not need to request a resource from a base station, but directly sends the data to the base station by using a pre-allocated resource. The base station receives, on the pre-allocated resource by using a reception technology such as blind detection, data that is sent by the terminal device by using the grant-free transmission mechanism. Data transmitted in a grant-free transmission mechanism is referred to as grant-free data, and the pre-allocated resource used for grant-free transmission is referred to as a grant-free resource.

To improve transmission reliability of the grant-free data, the terminal device may send the grant-free data to the base station by using a repeated transmission technology. In the repeated transmission technology, the terminal device may repeatedly send a specific piece of data in K (K>1) consecutive slots without waiting for any feedback such as a NACK or scheduling information from the base station. As shown in FIG. 1, when the terminal device transmits data by using the repeated transmission technology, the terminal device sends one redundancy version (RV) of the data in each slot. Redundancy versions sent in different slots may be the same or different.

To further improve data transmission reliability, the industry is studying the introduction of a hybrid automatic repeat request (HARQ) technology widely applied to existing mobile communications systems (for example, a long term evolution (LTE) system) to 5G communication. In the HARQ technology, after a transmit end initially transmits specific data in a specific slot or a plurality of consecutive slots, if the transmit end receives an indication that is fed back by a receive end and that indicates that the data is not correctly received, the transmit end retransmits a redundancy version of the data, so that the receive end can receive and combine the retransmitted data and the initially transmitted data, to improve data transmission reliability.

To implement a HARQ function, when retransmitting data, the terminal device needs to learn of initially transmitted data corresponding to the retransmitted data, and when receiving the retransmitted data, the base station also needs to learn of the initially transmitted data corresponding to the retransmitted data. In this way, the initially transmitted data and the retransmitted data that are received can be combined, to improve data transmission reliability. Such a process is ensured by using a HARQ process. To be specific, when receiving the retransmitted data, the base station also learns of HARQ process information, such as a process number (ID), corresponding to the retransmitted data, and then combines the retransmitted data with buffered data in a buffer of a corresponding HARQ process.

In the grant-free transmission mechanism, HARQ processes used in K transmissions when the terminal device transmits data by using the repeated transmission technology are the same, and HARQ process numbers of the used HARQ processes are determined based on the first transmission in the K transmissions. Therefore, when receiving data that is transmitted by using the repeated transmission technology, the base station needs to detect the first transmission in the K transmissions and determine that a current transmission is the first transmission, to determine the HARQ process numbers of the HARQ processes used in the K transmissions.

Because of uncertainty of a moment at which data arrives at the terminal device and the requirement for a low latency in data transmission in the URLLC scenario, if there is an available grant-free resource, after data arrives, the terminal device sends the data to the base station by using the grant-free resource within a shortest possible time. This means that the terminal device starts K repeated transmissions of the data in any slot with a configured grant-free resource. For the terminal and the base station, start locations of repeated transmissions are not fixed and unpredictable. In this case, because the base station needs to determine, by detecting the first transmission in the repeated transmissions, a number of a HARQ process used by the terminal device to send data, once the base station does not detect and determine the first transmission, the base station cannot determine the number of the HARQ process used by the terminal device to send the data.

SUMMARY

In view of this, this application provides a method for repeated transmission and a terminal device, to increase a success rate of determining, by a network device, a HARQ process used in repeated transmissions.

According to a first aspect, this application provides a method for repeated transmission, including:

determining, by a terminal device, a transmission time unit used in the first transmission of to-be-transmitted data;

determining, by the terminal device based on the determined transmission time unit and a parameter Q, a hybrid automatic repeat request HARQ process used to transmit the to-be-transmitted data, where Q is an integer greater than or equal to 1; and when repeated transmission of the to-be-transmitted data is not terminated before the first specific transmission time unit after the determined transmission time unit, performing, by the terminal device starting from the determined transmission unit, one transmission of the to-be-transmitted data in each transmission time unit by using the HARQ process until the last transmission of the to-be-transmitted data is performed in the first specific transmission time unit, where a period of the specific transmission time unit in a time domain resource is Q transmission time units.

According to a second aspect, this application further provides a terminal device, including:

a processing unit, configured to determine a transmission time unit used in the first transmission of to-be-transmitted data;

a HARQ process determining unit, configured to determine, based on the determined transmission time unit and a parameter Q, a hybrid automatic repeat request HARQ process used to transmit the to-be-transmitted data, where Q is an integer greater than or equal to 1; and a transmission unit, configured to: when repeated transmission of the to-be-transmitted data is not terminated before the first specific transmission time unit after the determined transmission time unit, perform, by the terminal device starting from the determined transmission unit, one transmission of the to-be-transmitted data in each transmission time unit by using the HARQ process until the last transmission of the to-be-transmitted data is performed in the first specific transmission time unit, where a period of the specific transmission time unit in a time domain resource is Q transmission time units.

According to a third aspect, this application provides a method for repeated transmission, including:

determining, by a terminal device, a grant-free transmission time unit used in the first transmission of to-be-transmitted data, where the grant-free transmission time unit is a transmission time unit in which a grant-free resource is configured for the terminal device;

determining, by the terminal device based on the determined grant-free transmission time unit and a parameter Q, a HARQ process used to transmit the to-be-transmitted data, where a value of Q is an integer greater than or equal to 1; and when repeated transmission of the to-be-transmitted data is not terminated before the first specific grant-free transmission time unit after the determined grant-free transmission time unit, performing, by the terminal device starting from the determined grant-free transmission time unit by using the HARQ process, one transmission of the to-be-transmitted data on a grant-free resource configured for the terminal device in each grant-free transmission time unit until the last transmission of the to-be-transmitted data is performed in the first specific grant-free transmission time unit, where the specific grant-free transmission time unit is specifically a grant-free transmission time unit periodically appearing in grant-free transmission time units, and a period of the specific grant-free transmission time unit is Q.

According to a fourth aspect, this application further provides a terminal device, where the terminal device includes:

a processing unit, configured to determine a grant-free transmission time unit used in the first transmission of to-be-transmitted data, where the grant-free transmission time unit is a transmission time unit in which a grant-free resource is configured for the terminal device;

a HARQ process determining unit, configured to determine, based on the determined grant-free transmission time unit and a parameter Q, a HARQ process used to transmit the to-be-transmitted data, where a value of Q is an integer greater than or equal to 1; and a transmission unit, configured to: when repeated transmission of the to-be-transmitted data is not terminated before the first specific grant-free transmission time unit after the determined grant-free transmission time unit, perform, starting from the determined grant-free transmission time unit by using the HARQ process, one transmission of the to-be-transmitted data on a grant-free transmission resource configured for the terminal device in each grant-free transmission time unit until the last transmission of the to-be-transmitted data is performed in the first specific grant-free transmission time unit, where the specific grant-free transmission time unit is specifically a grant-free transmission time unit periodically appearing in grant-free transmission time units, and a period of the specific grant-free transmission time unit is Q.

According to a fifth aspect, this application further provides a method for repeated transmission, where the method includes:

determining, based on an index of a grant-free transmission time unit $n_{t+k-1}$ in which uplink data sent by a terminal device is detected or a sequence number of the grant-free transmission time unit $n_{t+k-1}$ and a parameter Q corresponding to the terminal device, a number of a HARQ process used by the terminal device to send the uplink data, where the grant-free transmission time unit is specifically a transmission time unit in which a grant-free resource is configured for the terminal device;

decoding the detected uplink data;

in a case of incorrect decoding, determining, by a network device, whether the grant-free transmission time unit $n_{t+k-1}$ is a specific grant-free transmission time unit; and if the grant-free transmission time unit $n_{t+k-1}$ is the specific grant-free transmission time unit, performing, by the network device, one of the following types of processing:

processing (1): sending a feedback message to the terminal device, where the feedback message carries an indication indicating incorrect reception;

processing (2): sending uplink grant information to schedule the terminal device to retransmit the uplink data; and processing (3): discarding the grant-free data sent by the terminal device, and clearing data in a buffer corresponding to the determined number of the HARQ process.

According to an implementation of the fifth aspect, the method for repeated transmission further includes:

if the grant-free transmission time unit $n_{t+k-1}$ is not the specific grant-free transmission time unit, receiving, by the network device, the uplink data again in a next grant-free transmission time unit of the terminal device.

According to another implementation of the fifth aspect, the method for repeated transmission further includes:

in a case of correct decoding, sending, by the network device to the terminal device, a feedback message carrying an indication indicating correct reception.

According to a sixth aspect, this application further provides a network device, where the network device includes:

a HARQ process determining unit, configured to determine, based on an index of a grant-free transmission time unit $n_{t+k-1}$ in which uplink data sent by a terminal device is detected or a sequence number of the grant-free transmission time unit $n_{t+k-1}$ and a parameter Q corresponding to the terminal device, a number of a HARQ process used by the terminal device to send the uplink data, where the grant-free transmission time unit is specifically a transmission time unit in which a grant-free resource is configured for the terminal device;

a decoding unit 16, configured to decode the detected uplink data;

a judging unit, configured to: when the uplink data fails to be decoded, determine whether the grant-free transmission time unit $n_{t+k-1}$ is a specific grant-free transmission time unit; and a sending unit, configured to: when the uplink data fails to be decoded and the grant-free transmission time unit $n_{t+k-1}$ is the specific grant-free transmission time unit, send, to the terminal device, a feedback message carrying an indication indicating correct reception or uplink grant information.

According to an implementation of the sixth aspect, the network device further includes:

a receiving unit, configured to: when the uplink data fails to be decoded and the grant-free transmission time unit $n_{t+k-1}$ is the specific grant-free transmission time unit, continue to receive the uplink data in a next grant-free transmission time unit of the terminal device.

According to another implementation of the sixth aspect, the sending unit is further configured to: after the uplink data is correctly received, send, to the terminal device, a feedback message carrying an indication indicating correct reception.

According to a seventh aspect, this application provides a computer readable storage medium, where the computer readable storage medium stores an instruction, and when the instruction is run on a computer, the computer is enabled to perform the methods according to the foregoing aspects.

According to an eighth aspect, this application provides a computer program product including an instruction, and when the computer program product is run on a computer, the computer is enabled to perform the methods according to the foregoing aspects.

According to a ninth aspect, this application provides a method for repeated transmission, including:

determining, by a terminal device based on a parameter Q, a grant-free transmission time unit used in the first transmission of to-be-transmitted data, where Q is a period of a grant-free transmission time unit, in grant-free transmission time units, that can be used in the first transmission in repeated transmissions, and a value of Q is greater than or equal to 1;

determining, by the terminal device based on the determined grant-free transmission time unit and the parameter Q, a hybrid automatic repeat request HARQ process used to transmit the to-be-transmitted data; and performing, by the terminal device, the first transmission of the to-be-transmitted data by using the determined HARQ process in the determined grant-free transmission time unit.

In a first implementation of the ninth aspect, the determining, by a terminal device based on a parameter Q, a grant-free transmission time unit used in the first transmission of to-be-transmitted data includes:

determining, by the terminal device based on the parameter Q and a time domain period P of a grant-free resource, the grant-free transmission time unit used in the first transmission of the to-be-transmitted data.

In a second implementation of the ninth aspect, according to the method according to the first implementation of the ninth aspect, the determining, by the terminal device based on the parameter Q and a time domain period P of a grant-free resource, the grant-free transmission time unit that can be used in the first transmission of the to-be-transmitted data specifically includes:

when an index of a transmission time unit satisfies the following seventh relational expression, the transmission time unit is the grant-free transmission time unit that can be used in the first transmission of the to-be-transmitted data, where the seventh relational expression is (T_index−T_Index_Start)mod(P*Q)=T_offset_value, where T_index is the index of the transmission time unit, T_Index_Start is an index of the first grant-free transmission time unit, P is the time domain period of the grant-free resource, Q is the period of the grant-free transmission time unit, in the grant-free transmission time units, that can be used in the first transmission in the repeated transmissions, T_offset_value is a preset offset value, and a value of T_offset_value may be specifically one of 0, P, 1*P, . . . , or (Q−1)*P.

In a third implementation of the ninth aspect, according to the method according to the first implementation of the ninth aspect, the determining, by the terminal device based on the parameter Q and a time domain period P of a grant-free resource, the grant-free transmission time unit that can be used in the first transmission of the to-be-transmitted data specifically includes:

determining the grant-free transmission time unit based on the time domain period P of the grant-free resource; and determining, from the determined grant-free transmission resource based on the parameter Q, the grant-free transmission time unit that can be used in the first transmission in the repeated transmissions.

In a fourth implementation of the ninth aspect, according to the method according to the third implementation of the ninth aspect, the determining, from the determined grant-free transmission resource based on the parameter Q, the grant-free transmission time unit that can be used in the first transmission in the repeated transmissions includes:

determining that a grant-free transmission time unit satisfying any one of the following relational expressions is the grant-free transmission time unit that can be used in the first transmission in the repeated transmissions:

an eighth relational expression: GF_T_Index mod Q=0;

a ninth relational expression: GF_T_Index mod Q=T_offset_value;

a tenth relational expression: (T_Index/P)mod Q=0;

an eleventh relational expression: ((T_Index−T_Index_Start)/P)mod Q=0;

a twelfth relational expression: (T_Index/P)mod Q=T_offset_value; and a thirteenth relational expression: ((T_Index−T_Index_Start)/P)mod Q=T_offset_value, where GF_T_Index is a sequence number of the grant-free transmission time unit, T_Index is an index of the grant-free transmission time unit, T_offset_value is an offset value, T_Index_Start is an index of the first grant-free transmission time unit, P is the time domain period of the grant-free resource, P is an integer greater than or equal to 1, and Q is the period of the grant-free transmission time unit, in the grant-free transmission time units, that can be used in the first transmission in the repeated transmissions.

In a fifth implementation of the ninth aspect, according to the method according to any one of the ninth aspect and the implementations of the ninth aspect, the determining, by the terminal device based on the determined grant-free transmission time unit and the parameter Q, a hybrid automatic repeat request HARQ process used to transmit the to-be-transmitted data includes:

determining a HARQ process number based on a sequence number of the determined grant-free transmission time unit, the parameter Q, and a maximum quantity of HARQ processes supported by a grant-free resource of the terminal device.

In a sixth implementation of the ninth aspect, according to the method according to the fifth implementation of the ninth aspect, the determining a HARQ process number based on a sequence number of the determined grant-free transmission time unit, the parameter Q, and a maximum quantity of HARQ processes supported by a grant-free resource of the terminal device includes:

determining the HARQ process number of the HARQ process according to one of the following relational expressions:

a fourteenth relational expression: HARQ_ID=floor(GF_T_Index/Q)mod N_GF; and a fifteenth relational expression: HARQ_ID=floor(GF_T_Index/Q)mod N_GF+H_offset_value, where floor( ) indicates rounding down, HARQ_ID is the HARQ process number, GF_T_Index is the sequence number of the grant-free transmission time unit, N_GF is the maximum quantity of HARQ processes supported by the grant-free resource of the terminal device, and H_offset_value is a preset process number offset value.

In a seventh implementation of the ninth aspect, according to the method according to any one of the ninth aspect and the first implementation to the fourth implementation of the ninth aspect, the determining, by the terminal device based on the determined grant-free transmission time unit and the parameter Q, a hybrid automatic repeat request HARQ process used to transmit the to-be-transmitted data includes:

determining a HARQ process number based on an index of the determined grant-free transmission time unit, the parameter Q, and a maximum quantity of supported HARQ processes.

In an eighth implementation of the ninth aspect, according to the method according to the seventh implementation of the ninth aspect, the determining, by the terminal device based on the determined grant-free transmission time unit and the parameter Q, a hybrid automatic repeat request HARQ process used to transmit the to-be-transmitted data includes:

determining the process number of the HARQ process according to one of the following relational expressions:

a sixteenth relational expression: HARQ_ID=floor(T_Index/(P*Q))mod N_GF; and a seventeenth relational expression: HARQ_ID=floor(T_Index/(P*Q))mod N_GF+H_offset_value, where floor( ) indicates rounding down, HARQ_ID is the HARQ process number, T_Index is the index of the grant-free transmission time unit, N_GF is the maximum quantity of HARQ processes supported by a grant-free resource of the terminal device, H_offset_value is a preset process number offset value, P is the time domain period of the grant-free resource, and P is an integer greater than or equal to 1.

In a ninth implementation of the ninth aspect, the method according to any one of the ninth aspect and the implementations of the ninth aspect further includes:

determining, based on a sequence number or an index of a grant-free transmission time unit in which each transmission in the repeated transmissions is performed, a redundancy version of the to-be-transmitted data in each transmission or an MCS used in each transmission.

In a tenth implementation of the ninth aspect, the method according to any one of the ninth aspect and the implementations of the ninth aspect further includes:

before the determining, based on a parameter Q, a grant-free transmission time unit used in the first transmission of to-be-transmitted data, obtaining, by the terminal device, the parameter Q and the time domain period P of the grant-free resource.

According to a tenth aspect, this application further provides a terminal device, including:

a processing unit, configured to determine, based on a parameter Q, a grant-free transmission time unit used in the first transmission of to-be-transmitted data, where Q is a period of a grant-free transmission time unit, in grant-free transmission time units, that can be used in the first transmission in repeated transmissions, and a value of Q is greater than or equal to 1;

a HARQ process determining unit, configured to determine, based on the determined grant-free transmission time unit and the parameter Q, a hybrid automatic repeat request HARQ process used to transmit the to-be-transmitted data; and a transmission unit, configured to perform the first transmission of the to-be-transmitted data by using the determined HARQ process in the determined grant-free transmission time unit.

In a first implementation of the tenth aspect, the determining, based on a parameter Q, a grant-free transmission time unit used in the first transmission of to-be-transmitted data includes:

determining, based on the parameter Q and a time domain period P of a grant-free resource, the grant-free transmission time unit used in the first transmission of the to-be-transmitted data.

In a second implementation of the tenth aspect, according to the device according to the first implementation of the tenth aspect, the determining, based on the parameter Q and a time domain period P of a grant-free resource, the grant-free transmission time unit that can be used in the first transmission of the to-be-transmitted data specifically includes:

when an index of a transmission time unit satisfies the following seventh relational expression, the transmission time unit is the grant-free transmission time unit that can be used in the first transmission of the to-be-transmitted data, where the seventh relational expression is (T_index−T_Index_Start)mod(P*Q)=T_offset_value, where T_index is the index of the transmission time unit, T_Index_Start is an index of the first grant-free transmission time unit, P is the time domain period of the grant-free resource, Q is the period of the grant-free transmission time unit, in the grant-free transmission time units, that can be used in the first transmission in the repeated transmissions, T_offset_value is a preset offset value, and a value of T_offset_value may be specifically one of 0, P, 1*P, . . . , or (Q−1)*P.

In a third implementation of the tenth aspect, according to the device according to the first implementation of the tenth aspect, the determining, based on the parameter Q and a time domain period P of a grant-free resource, the grant-free transmission time unit that can be used in the first transmission of the to-be-transmitted data specifically includes:

determining the grant-free transmission time unit based on the time domain period P of the grant-free resource; and determining, from the determined grant-free transmission resource based on the parameter Q, the grant-free transmission time unit that can be used in the first transmission in the repeated transmissions.

In a fourth implementation of the tenth aspect, according to the device according to the third implementation of the tenth aspect, the determining, from the determined grant-free transmission resource based on the parameter Q, the grant-free transmission time unit that can be used in the first transmission in the repeated transmissions includes:

determining that a grant-free transmission time unit satisfying any one of the following relational expressions is the grant-free transmission time unit that can be used in the first transmission in the repeated transmissions:

an eighth relational expression: GF_T_Index mod Q=0;

a ninth relational expression: GF_T_Index mod Q=T_offset_value;

a tenth relational expression: (T_Index/P)mod Q=0;

an eleventh relational expression: ((T_Index−T_Index_Start)/P)mod Q=0;

a twelfth relational expression: (T_Index/P)mod Q=T_offset_value; and a thirteenth relational expression: ((T_Index−T_Index_Start)/P)mod Q=T_offset_value, where GF_T_Index is a sequence number of the grant-free transmission time unit, T_Index is an index of the grant-free transmission time unit, T_offset_value is an offset value, T_Index_Start is an index of the first grant-free transmission time unit, P is the time domain period of the grant-free resource, P is an integer greater than or equal to 1, and Q is the period of the grant-free transmission time unit, in the grant-free transmission time units, that can be used in the first transmission in the repeated transmissions.

In a fifth implementation of the tenth aspect, according to the device according to any one of the tenth aspect and the implementations of the tenth aspect, the determining, based on the determined grant-free transmission time unit and the parameter Q, a hybrid automatic repeat request HARQ process used to transmit the to-be-transmitted data includes:

determining a HARQ process number based on a sequence number of the determined grant-free transmission time unit, the parameter Q, and a maximum quantity of HARQ processes supported by a grant-free resource of the terminal device.

In a sixth implementation of the tenth aspect, according to the device according to the fifth implementation of the tenth aspect, the determining a HARQ process number based on a sequence number of the determined grant-free transmission time unit, the parameter Q, and a maximum quantity of HARQ processes supported by a grant-free resource of the terminal device includes:

determining the HARQ process number of the HARQ process according to one of the following relational expressions:

a fourteenth relational expression: HARQ_ID=floor(GF_T_Index/Q)mod N_GF; and a fifteenth relational expression: HARQ_ID=floor(GF_T_Index/Q)mod N_GF+H_offset_value, where floor( ) indicates rounding down, HARQ_ID is the HARQ process number, GF_T_Index is the sequence number of the grant-free transmission time unit, N_GF is the maximum quantity of HARQ processes supported by the grant-free resource of the terminal device, and H_offset_value is a preset process number offset value.

In a seventh implementation of the tenth aspect, according to the device according to any one of the tenth aspect and the first implementation to the fourth implementation of the tenth aspect, the determining, based on the determined grant-free transmission time unit and the parameter Q, a hybrid automatic repeat request HARQ process used to transmit the to-be-transmitted data includes:

determining a HARQ process number based on an index of the determined grant-free transmission time unit, the parameter Q, and a maximum quantity of supported HARQ processes.

In an eighth implementation of the tenth aspect, according to the device according to the seventh implementation of the tenth aspect, the determining, based on the determined grant-free transmission time unit and the parameter Q, a hybrid automatic repeat request HARQ process used to transmit the to-be-transmitted data includes:

determining the process number of the HARQ process according to one of the following relational expressions:

a sixteenth relational expression: HARQ_ID=floor(T_Index/(P*Q))mod N_GF; and a seventeenth relational expression: HARQ_ID=floor(T_Index/(P*Q))mod N_GF+H_offset_value, where floor( ) indicates rounding down, HARQ_ID is the HARQ process number, T_Index is the index of the grant-free transmission time unit, N_GF is the maximum quantity of HARQ processes supported by a grant-free resource of the terminal device, H_offset_value is a preset process number offset value, P is the time domain period of the grant-free resource, and P is an integer greater than or equal to 1.

In a ninth implementation of the tenth aspect, according to the device according to any one of the tenth aspect and the implementations of the tenth aspect, the processing unit is further configured to:

determine, based on a sequence number or an index of a grant-free transmission time unit in which each transmission in the repeated transmissions is performed, a redundancy version of the to-be-transmitted data in each transmission or an MCS used in each transmission.

In a tenth implementation of the tenth aspect, according to the device according to any one of the tenth aspect and the implementations of the tenth aspect, the transmission unit is further configured to:

obtain the parameter Q and the time domain period P of the grant-free resource.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that in a current cellular communications system, for example, in a communications system such as a global system for mobile communications (GSM) system, a wideband code division multiple access (WCDMA) system, or a long term evolution (LTE) system, voice communication and data communication are mainly supported. A conventional base station usually supports a limited quantity of connections, and this is easy to implement.

Figures 1, 2:
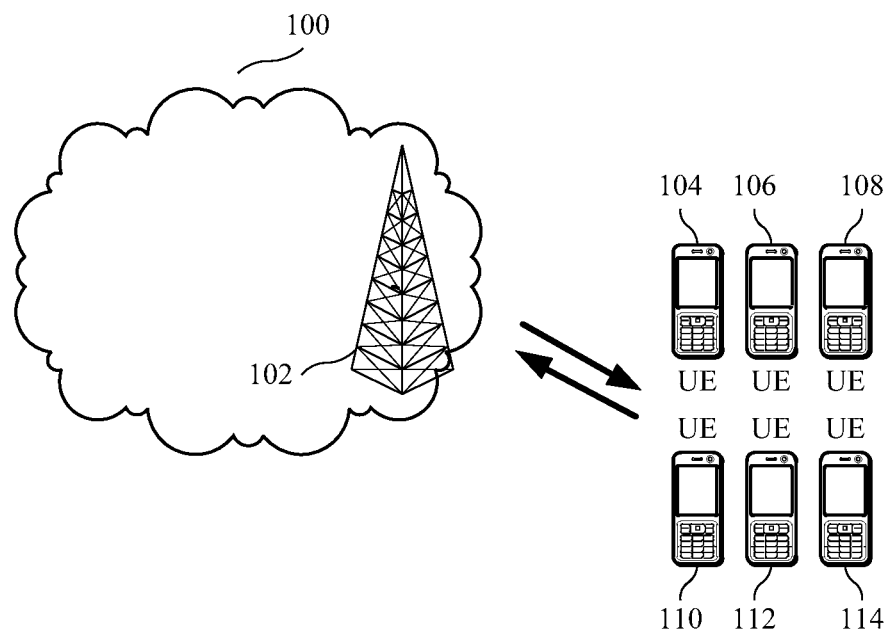
FIG. 1 is a schematic diagram of an existing repeated transmission technology.
FIG. 2 is a schematic structural diagram of a communications system according to an embodiment of the present invention.

FIG. 2 is a schematic diagram of a communications network to which an embodiment of the present invention is applied. As shown in FIG. 2, a communications network 100 includes a network device 102 and terminal devices (which are referred to as UEs in the FIGS. 104, 106, 108, 110, 112, and 114. The network device is connected to the terminal devices in a wireless manner, a wired manner, or another manner. It should be understood that in FIG. 2, that the communications network 100 includes one network device is merely used as an example for description, but this embodiment of the present invention is not limited thereto. For example, the communications network may alternatively include more network devices. Similarly, the network may alternatively include more terminal devices, and the network may further include another device.

The communications network in this embodiment of the present invention may be a public land mobile network (PLMN), a device-to-device (D2D) network, an M2M network, or another network. FIG. 1 is merely a simplified schematic diagram of an example. The communications network may further include another network device that is not shown in FIG. 1.

The terminal device in this embodiment of the present invention is a device having a wireless sending and receiving function, and may be deployed on land and be an indoor device, an outdoor device, a handheld device, a wearable device, or a vehicle-mounted device, may be deployed on the water (for example, on a ship), or may be deployed in the air (for example, in an airplane, a balloon, or a satellite). The terminal device may be a mobile phone, a tablet computer (Pad), a computer having a wireless sending and receiving function, a virtual reality (VR) terminal device, an augmented reality (AR) terminal device, a wireless terminal in industrial control, a self-driving wireless terminal, a wireless terminal in telemedicine, a wireless terminal in a smart grid, a wireless terminal in transportation safety, a wireless terminal in a smart city, a wireless terminal in a smart home, or the like. This embodiment of this application imposes no limitation on an application scenario. The terminal device sometimes may also be referred to as user equipment (UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved PLMN network, or the like.

The network device in this embodiment of the present invention may be a device configured to communicate with the terminal device. The network device may be a base transceiver station (BTS) in a global system for mobile communications (GSM) or a code division multiple access ("CDMA) system, may be a NodeB (NB) in a wideband code division multiple access (WCDMA) system, may be an evolved NodeB ("eNB" or "eNodeB" for short) in a long term evolution (LTE) system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or the like.

In this application, grant-free transmission is specific to uplink data transmission, and may be represented as grant-free transmission in English. The grant-free transmission may be a transmission mod in which a terminal device may transmit uplink data without dynamic scheduling by and/or a definite grant from a network device. In the grant-free transmission, when the terminal device needs to transmit uplink data each time, the terminal device does not need to send a scheduling request to a base station, and does not need to obtain scheduling information, in response to the scheduling request, from the base station, but may directly send the uplink data by using a predefined transmission resource or a transmission resource pre-allocated by the network device. The network device detects, on the predefined or pre-allocated transmission resource, the uplink data sent by the terminal device. The detection may be blind detection, may be detection performed based on a specific control field in the uplink data, or may be detection performed in another manner.

The scheduling information may be an uplink grant that is sent by the network device to the terminal device after receiving the uplink scheduling request sent by the terminal device. The uplink grant indicates a transmission resource that is allocated to the terminal device and that is used for uplink transmission.

The transmission resource may be a physical resource used to transmit uplink data. The physical resource is a time-frequency resource limited by one or more transmission time units in time domain or a frequency band of a specific size in frequency domain. The transmission time unit may be a minimum time unit for one transmission, and may be a slot, a mini-slot, a subframe, a transmission time interval (TTI), or N symbols (for example, N OFDM symbols). A size of a TTI may be 1 ms, or may be another preset or predefined value. A size of a frequency band may be represented by inheriting a bandwidth representation manner in an existing communications system (for example, an LTE communications system), for example, may be represented by a quantity of subcarriers, may be represented by a quantity of resource blocks (RB), or may be represented by a quantity of subbands.

The transmission resource may further include but is not limited to a combination of one or more of the following resources:

a space domain resource such as a transmit antenna or beam;

a code domain resource such as a sparse code multiple access (SCMA) codebook, a low density signature (LDS) sequence, or a CDMA code; and an uplink pilot resource, where the uplink pilot resource includes a reference signal sequence such as a demodulation reference signal (DMRS) sequence, a preamble sequence, or a sounding reference signal (Sounding RS) sequence.

In this application, the transmission resource used for grant-free transmission is also referred to as a grant-free resource.

In the grant-free transmission, a time at which the terminal device starts to perform the first transmission in repeated transmissions is not fixed and unpredictable, and the network device cannot predict a time at which the terminal device starts to perform the repeated transmission either. Therefore, when the network device receives data sent by the terminal device through repeated transmission, there is a relatively high possibility that the first transmission in repeated transmissions cannot be detected or determined, and consequently a HARQ process used by the terminal device to perform the repeated transmissions cannot be determined.

To increase a probability that the network device successfully determines a HARQ process used by the terminal device to perform repeated transmissions, some technologies may be introduced to assist the network device in detecting and determining the first transmission. For example, a DMRS (such as a DMRS sequence or a DMRS resource) used by the terminal device in the first transmission in the repeated transmissions differs from a DMRS used in a transmission other than the first transmission in the repeated transmissions. In this way, if the network device detects the DMRS used in the first transmission, the network device may determine that the current transmission is the first transmission in the repeated transmissions. However, in an actual case, due to many reasons such as a relatively poor channel condition, the network device probably cannot detect data transmission performed by the terminal device, and further cannot determine whether the terminal device performs the first transmission in the repeated transmissions. Therefore, even if the auxiliary technology is introduced, there is a relatively high possibility that the network device cannot determine the HARQ process used by the terminal device to perform the repeated transmissions.

In view of the foregoing technical disadvantage, the embodiments of the present invention provide a method for repeated transmission and a terminal device, to increase a success rate of determining, by a network device, a HARQ process used in repeated transmissions.

Figure 3:
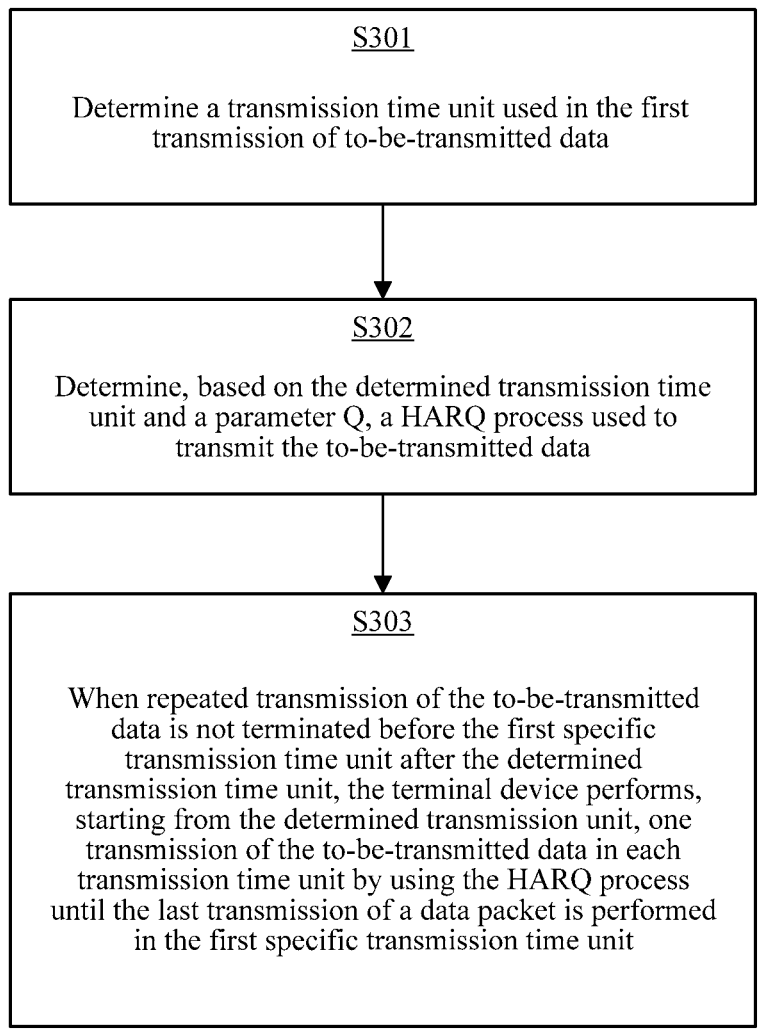
FIG. 3 is a schematic flowchart of a method for repeated transmission according to an embodiment of the present invention.

An embodiment of this application provides a method for repeated transmission. As shown in FIG. 3, the method is applied to a terminal device, and may include the following steps.

Step S301: Determine a transmission time unit used in the first transmission of to-be-transmitted data.

Step S302: Determine, based on the determined transmission time unit and a parameter Q, a HARQ process used to transmit the to-be-transmitted data, where a value of Q is an integer greater than or equal to 1.

In an embodiment, the parameter Q may be specified by a network device and notified to the terminal device. The network device may specify different values for parameters Q of different terminal devices, may specify a same value for parameters Q of different terminal devices, or may specify a plurality of values of a parameter Q for one terminal device. When a grant-free resource preconfigured by the network device for the terminal device includes a plurality of frequency resources, the network device may configure a parameter Q for each of the plurality of frequency resources, or may configure a same parameter Q for the plurality of frequency resources. The network device may add the parameter Q configured by the network device for the terminal device to signaling sent by the network device to the terminal device. The signaling may be higher layer signaling (for example, medium access control (MAC) signaling or radio resource control (RRC) signaling), or may be physical layer signaling (for example, downlink control information (DCI)). In an embodiment, the signaling carrying the parameter Q may further carry information indicating the grant-free resource configured for the terminal device. If the network device configures a parameter Q for each frequency resource in the grant-free resource of the terminal device, the network device may add the parameter Q corresponding to the frequency resource to the signaling. In this embodiment of the present invention, one frequency resource may be one RB, a plurality of contiguous RBs that are bound together, one carrier, or a plurality of contiguous carriers that are bound together.

In an embodiment, the value of the parameter Q is specified in a standard, for example, specified in a standard followed by both the terminal device and the network device.

In an embodiment, the value of the parameter Q is less than a maximum quantity K of repeated transmissions. In a repeated transmission technology, data is transmitted for a maximum of K times. To be specific, if no repeated transmission from the first transmission to the Kth transmission is terminated, the data is continuously sent for K times, and a repeated transmission procedure is terminated after the Kth transmission is performed. Maximum quantities K of repeated transmissions that are supported by different terminal devices may be the same or different, and even maximum quantities K of repeated transmissions that are supported by one terminal device within different time periods may be the same or different. A maximum quantity K of repeated transmissions supported by the terminal device may be predefined (for example, specified in a standard), or may be specified by the network device and notified to the terminal device by using signaling. When the maximum quantity K of repeated transmissions supported by the terminal device is specified by the network device, the network device may add the maximum quantity K of repeated transmissions supported by the terminal device and the parameter Q to a same piece of signaling for sending to the terminal device, or may add the maximum quantity K of repeated transmissions to another piece of signaling for sending to the terminal device.

In an embodiment, the parameter Q is specifically a maximum quantity K of repeated transmissions supported by the terminal device.

In an embodiment, step S302 may specifically include: determining a HARQ process number based on an index of the determined transmission time unit, the parameter Q, and a maximum quantity N of supported HARQ process. In a specific implementation, the HARQ process number may be determined according to a formula (1) or a formula (2).

The formula (1) is:

$$HARQ\_ID = \text{floor}(T\_Index/Q) \bmod N; \text{ and}$$

the formula (2) is:

$$HARQ\_ID = \text{floor}(T\_Index/Q) \bmod N + H\_offset\_value,$$
where floor( ) indicates rounding down, HARQ_ID is the HARQ process number, T_Index is the index of the transmission time unit, N is the maximum quantity of supported HARQ processes, and H_offset_value is a preset process number offset value.

When the grant-free resource configured by the network device for the terminal device includes a plurality of frequency resources, and a parameter Q is specified for each frequency resource, a HARQ process number corresponding to each frequency resource in a transmission time unit T_Index is calculated by using the formula (1) or (2) based on the parameter Q corresponding to each frequency resource. When the HARQ process number corresponding to each frequency resource is calculated by using the formula (2), different frequency resources may correspond to different preset process number offset values H_offset_value. In this embodiment of the present invention, H_offset_value may be predefined (for example, specified in a standard), or may be specified by the network device and notified to the terminal device by using signaling. When H_offset_value is specified by the network device, the network device may add H_offset_value and the parameter Q to a same piece of signaling for sending to the terminal device, or may add H_offset_value to another piece of signaling for sending to the terminal device.

Step S303: When repeated transmission of the to-be-transmitted data is not terminated before the first specific transmission time unit after the determined transmission time unit, the terminal device performs, starting from the determined transmission unit, one transmission of the to-be-transmitted data in each transmission time unit by using the HARQ process until the last transmission of the to-be-transmitted data is performed in the first specific transmission time unit, where a period of the specific transmission time unit in a time domain resource is Q transmission time units.

In this embodiment of the present invention, the specific transmission time unit is a transmission time unit in which the repeated transmission procedure is forcibly terminated. When any one of repeated transmissions needs to be performed in the specific transmission time unit, the repeated transmission procedure is terminated. To be specific, even if one transmission performed in the specific transmission time unit is not the Kth transmission in the repeated transmissions, all transmissions, in the repeated transmissions, that are not performed are no longer performed after the specific transmission unit.

In this embodiment of the present invention, the specific transmission time unit periodically appears in the time domain resource in a communications system, and the period of the specific transmission time unit is Q transmission time units. The parameter Q may also be understood as the period of the specific transmission time unit in a time domain resource.

In this embodiment of the present invention, the repeated transmissions may be terminated in advance due to either of the following termination conditions: a termination condition A: The terminal device receives an ACK fed back by the network device for the to-be-transmitted data sent by the terminal device, and a termination condition B: The terminal device receives, after performing a specific transmission (not the last transmission) in the repeated transmissions, an uplink grant sent by the network device for the to-be-transmitted data sent by the terminal device.

In a case of the termination condition A, the terminal device terminates a transmission, in the repeated transmissions, that is not performed, and empties a buffer corresponding to a HARQ process used in the repeated transmission.

In a case of the termination condition B, the terminal device terminates a transmission, in the repeated transmissions, that is not performed, and retransmits the to-be-sent data on a transmission resource specified by the grant. Certainly, in a case of another condition for terminating the repeated transmissions, a repeated transmission process of the to-be-transmitted data is also terminated.

In step S303, the terminal device determines whether a current transmission time unit is the specific transmission time unit, and if the current transmission time unit is the specific transmission time unit, terminates the repeated transmission procedure of the to-be-transmitted data after performing one transmission of the to-be-transmitted data in the current transmission time unit, or if the current transmission time unit is not the specific transmission time unit, performs one transmission of the to-be-transmitted data in a next transmission time unit of the current transmission time unit.

That the terminal device determines whether a current transmission time unit is the specific transmission time unit specifically includes:

when a value obtained by performing a modulo Q operation on an index of the current transmission time unit is equal to 0 or a preset time offset value, the current transmission time unit is the specific transmission time unit. The preset time offset value may be predefined (for example, specified in a standard), or may be specified by the network device and notified to the terminal device by using signaling. When the preset time offset value is specified by the network device, the network device may add the preset time offset value and the parameter Q to a same piece of signaling for sending to the terminal device, or may add the preset time offset value to another piece of signaling for sending to the terminal device.

In the repeated transmissions, one redundancy version of the to-be-transmitted data may be transmitted each time, and redundancy versions in different transmissions may be the same or different.

In an embodiment, a redundancy version is associated with a transmission time unit. To be specific, in a transmission time unit, the terminal device can send only a redundancy version related to the transmission time unit, and cannot send another version. In this embodiment, the method shown in FIG. 3 may further include: determining a redundancy version of the to-be-transmitted data in each transmission based on an index of a transmission time unit in which each transmission in the repeated transmissions is performed. Because the redundancy version is associated with the transmission time unit, the network device can accurately learn of redundancy version information of received data based on only a transmission time unit in which the data is received. An association relationship between a redundancy version and a transmission time unit may be predefined (for example, specified in a standard), or may be specified by the network device and notified to the terminal device by using signaling. The network device may add the association relationship between the redundancy version and the transmission time unit and the parameter Q to a same piece of signaling for sending to the terminal device, or may add the association relationship between the redundancy version and the transmission time unit to another piece of signaling for sending to the terminal device.

In the repeated transmissions, modulation and coding schemes (Modulation and Coding Scheme, MCS) used in different transmissions may be the same or different.

In an embodiment, an MCS is associated with a transmission time unit. To be specific, when sending data in a transmission time unit, the terminal device can use only an MCS associated with the transmission time unit, and cannot use another MCS. In this embodiment, the method shown in FIG. 3 may further include: determining, based on the index of the transmission time unit in which each transmission in the repeated transmissions is performed, an MCS that needs to be used in each transmission. Because the MCS is associated with the transmission time unit, the network device can accurately learn of, based on only a transmission time unit in which data is received, an MCS corresponding to the received data. An association relationship between an MCS and a transmission time unit may be predefined (for example, specified in a standard), or may be specified by the network device and notified to the terminal device by using signaling. The network device may add the association relationship between the MCS and the transmission time unit and the parameter Q to a same piece of signaling for sending to the terminal device, or may add the association relationship between the MCS and the transmission time unit to another piece of signaling for sending to the terminal device.

In an embodiment, if step S301 includes: if the first transmission time unit that can be used in the first transmission of the to-be-transmitted data is the specific transmission time unit, the terminal device may use the first transmission time unit after the specific transmission time unit as a transmission time unit used in the first transmission of the to-be-transmitted data.

In this embodiment of the present invention, from the time unit in which the first transmission is performed to the first specific transmission time unit, the terminal device performs the repeated transmissions by using the same HARQ process, and performs the last transmission of the to-be-transmitted data in the first specific transmission time unit. Provided that the network device detects any one of the repeated transmissions, the network device can determine, based on a transmission time unit in which the transmission is detected, a location, namely, the first specific transmission time unit, at which the last transmission in the repeated transmissions is performed, and determine, based on the first specific transmission time unit, the process number of the HARQ process used to perform the repeated transmissions. In the method provided in this embodiment of the present invention, the network device determines the process number of the HARQ process used in the repeated transmissions without depending on detection and determining of the first transmission. Therefore, there is a very high success rate when the network device determines the process number of the HARQ process used in the repeated transmissions.

Figure 4:
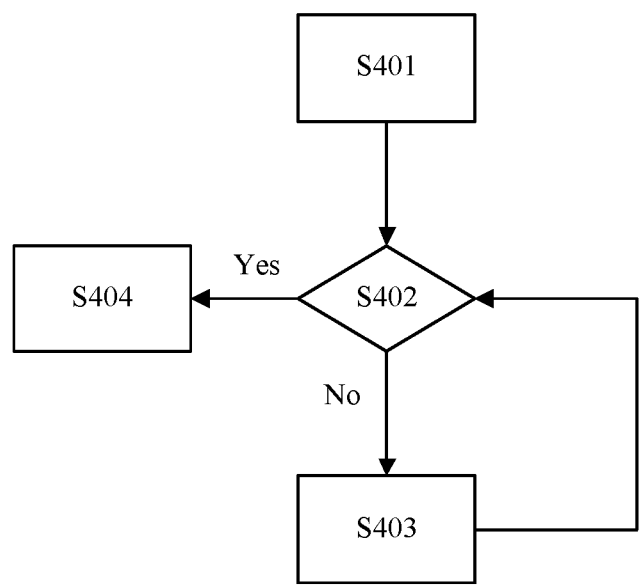
FIG. 4 is a schematic flowchart of a method for repeated transmission according to an embodiment of the present invention.

FIG. 4 shows another method for repeated transmission according to an embodiment of the present invention. The method is further described by using an example in which a transmission time unit is specifically a slot, and the method includes the following steps:

Step S401: A terminal device performs the first transmission in repeated transmissions of to-be-transmitted data on a grant-free resource in a slot n (n>0), sets k=1, and performs step S402.

Step S402: The terminal device determines whether a slot n+k−1 is a specific slot, and if the slot n+k−1 is the specific slot, performs step S404, if the slot n+k−1 is not the specific slot, performs step S403.

Step S403: The terminal device performs the $(k+1)^{th}$ transmission in the repeated transmissions of the to-be-transmitted data in a slot n+k, sets k=k+1, and performs step S402.

Step S404: Terminate a repeated transmission procedure. To be specific, the terminal device performs k transmissions of the to-be-transmitted data only in the slot n to the slot n+k−1, and does not perform the repeated transmissions of the to-be-transmitted data in the slot n+k and following slots; and the steps end.

In this embodiment, the specific slot is a specific example of the specific transmission time unit in the embodiment in FIG. 3, and a period in which the specific slot appears is Q slots. For a value of Q, refer to the related description in the embodiment shown in FIG. 3.

In step S402, the terminal device may determine, by using the following method, whether the slot n+k−1 is the specific slot.

It is assumed that an index of the slot n+k−1 is index=n+k−1. If index=n+k−1 satisfies the following formula (3) or formula (4), the terminal device may consider that the slot n+k−1 is the specific slot, and after performing one transmission of the to-be-transmitted data in the slot, terminate the repeated transmission procedure. Otherwise, the terminal device determines that the slot n+k−1 is not the specific slot.

The formula (3) is Index mod Q=0; and the formula (4) is Index mod Q=T_offset_value, where T_offset_value is the preset time offset value mentioned in the embodiment in FIG. 3, a value of T_offset_value is an integer greater than 0 and less than Q, and T_offset_value may be predefined (for example, specified in a standard), or may be specified by a network device and notified to the terminal device by using signaling.

Figure 5:
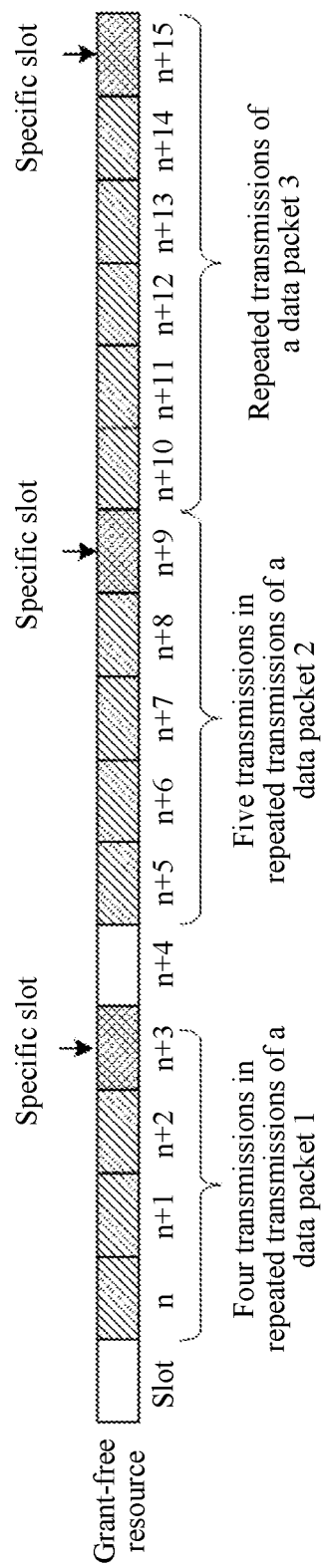
FIG. 5 is a schematic diagram of a repeated transmission process according to an embodiment of the present invention.

FIG. 5 shows a specific example of the method shown in FIG. 4. In the example, Q=6, and a maximum quantity K of repeated transmissions supported by the terminal device is also 6. Repeated transmissions of a data packet 1 are used as an example. The terminal device starts the first transmission in the repeated transmission in a slot n, and when determining that a slot n+3 is a specific slot, the terminal device terminates a repeated transmission procedure after performing one transmission of the data packet 1 in the slot n+3. To be specific, the terminal device no longer performs the remaining two transmissions in the repeated transmissions in slots n+4 and n+5.

In step S401 and step S403, when the terminal device performs one transmission in the repeated transmissions of the to-be-transmitted data, the following steps are included:

The terminal device determines, based on the formula (1) or the formula (2) in the foregoing embodiment, a HARQ process ID of a HARQ process used in the current transmission; and sends the to-be-sent data to the network device by using the process corresponding to the HARQ process ID.

Figure 6:
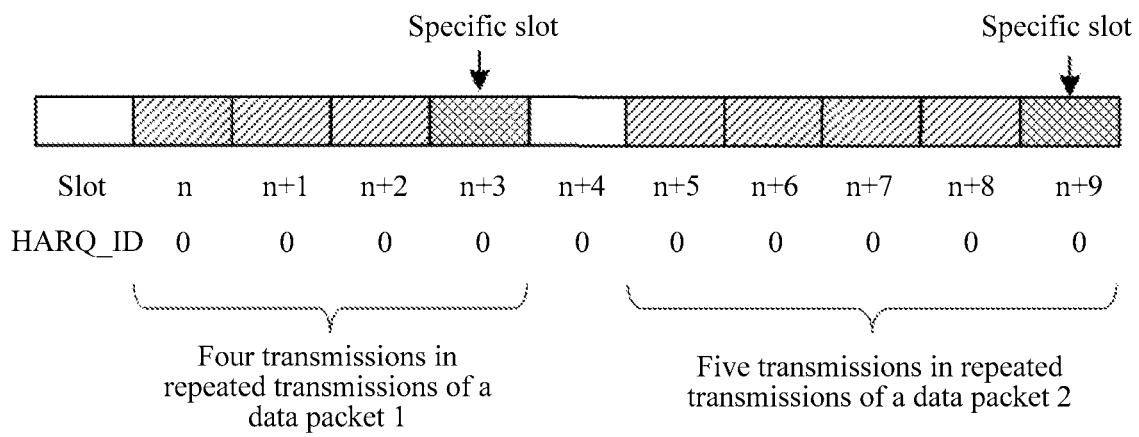
FIG. 6 is a schematic diagram of a process of determining a HARQ process number according to an embodiment of the present invention.

FIG. 6 shows an example of determining, by using the formula (1) or the formula (2), a number of a HARQ process used in each slot. In the example, Q=6, and a maximum quantity K of repeated transmissions supported by the terminal device is also 6. It can be learned from FIG. 6 that the terminal device performs the first four transmissions in the repeated transmissions of the data packet 1 by using a HARQ process 0, and performs the first five transmissions in repeated transmissions of a data packet 2 by using a HARQ process 1.

When detecting a specific transmission in repeated transmissions of a specific data packet of the terminal device in the slot n+k, the network device also calculates, according to the formula (1) or (2), a number of a HARQ process used for the data packet sent in the slot n+k.

In another embodiment, the terminal device does not need to calculate a HARQ process number in each transmission, and only needs to calculate a HARQ process number in the first transmission, and performs one transmission of the to-be-transmitted data by using a process corresponding to the HARQ process number in each subsequent slot until the first specific slot after the first transmission.

Figure 7:
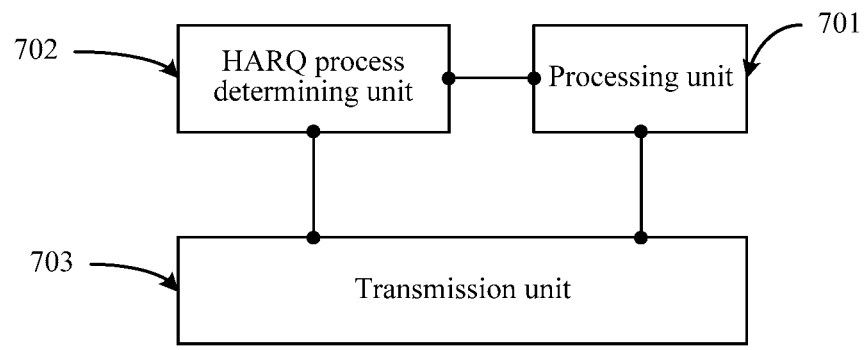
FIG. 7 is a schematic structural diagram of a terminal device according to an embodiment of the present invention.

An embodiment of the present invention further provides a terminal device configured to perform the transmission method provided in the foregoing embodiments. As shown in FIG. 7, the device includes:

a processing unit 701, configured to determine a transmission time unit used in the first transmission of to-be-transmitted data;

a HARQ process determining unit 702, configured to determine, based on the determined transmission time unit and a parameter Q, a hybrid automatic repeat request HARQ process used to transmit the to-be-transmitted data, where Q is an integer greater than or equal to 1; and a transmission unit 703, configured to: when repeated transmission of the to-be-transmitted data is not terminated before the first specific transmission time unit after the determined transmission time unit, perform, starting from the determined transmission unit, one transmission of the to-be-transmitted data in each transmission time unit by using the HARQ process until the last transmission of the to-be-transmitted data is performed in the first specific transmission time unit, where a period in which the specific transmission time unit appears in a time domain resource is Q transmission time units.

For specific implementation of each unit in the terminal device, refer to the related description in the embodiments shown in FIG. 3 and FIG. 4. Details are not described herein again.

Figure 8:
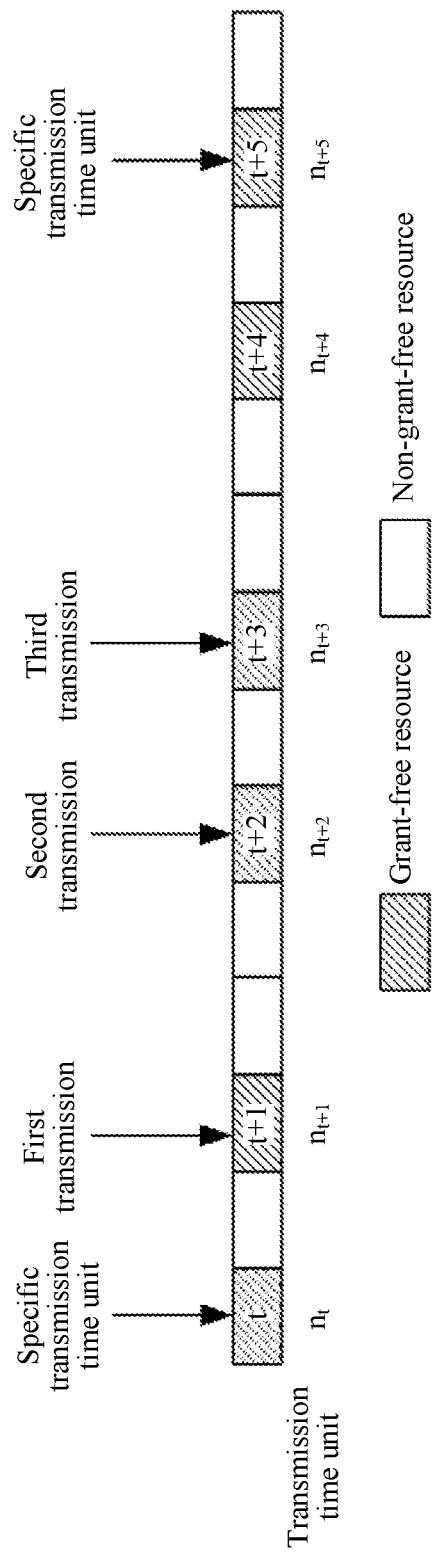
FIG. 8 is a schematic diagram of a configuration of a grant-free resource according to an embodiment of the present invention.
Figure 14:
FIG. 14 is a schematic diagram of a configuration of a grant-free resource according to another embodiment of the present invention.

In an embodiment, grant-free resources configured by a network device for the terminal device may be discrete or inconsecutive in time. For example, as shown in FIG. 8, the network device configures grant-free resources for the terminal device in transmission time units $n_t$, $n_{t+1}$, $n_{t+2}$, $n_{t+3}$, $n_{t+4}$, and $n_{t+5}$, and configures no grant-free resource in each of a transmission time unit between $n_t$ and $n_{t+1}$, a transmission time unit between $n_{t+1}$ and $n_{t+2}$, a transmission time unit between $n_{t+2}$ and $n_{t+3}$, a transmission time unit between $n_{t+3}$ and $n_{t+4}$, and a transmission time unit between $n_{t+4}$ and $n_{t+5}$. In this application, a transmission time unit in which a grant-free resource is configured for the terminal device is referred to as a grant-free transmission time unit. For example, the transmission time units $n_t$, $n_{t+1}$, $n_{t+2}$, $n_{t+3}$, $n_{t+4}$, and $n_{t+5}$ shown in FIG. 8 are referred to as grant-free transmission time units. In FIG. 8, a number in a shaded box, for example, "t", is a sequence number of a grant-free transmission time unit, and is a ranking of the grant-free time unit in all grant-free transmission time units corresponding to the terminal device. For example, the transmission time unit $n_t$ is a $t^{th}$ transmission time unit in which a grant-free resource is configured and that is of the terminal device, and the transmission time unit $n_{t+1}$ is a $(t+1)^{th}$ transmission time unit in which a grant-free resource is configured and that is of the terminal device. A number below each box in FIG. 8, for example, "$n_t$", is an index of a transmission time unit, and the index reflects a ranking of the transmission time unit in all transmission time units in a communications system. For a method for determining an index of a transmission time unit, refer to a method for determining a frame number and a subframe number in an existing communications system such as an LTE system. Details are not described herein again. For a sequence number of a grant-free transmission time unit, the terminal device may determine the sequence number of the grant-free transmission time unit according to a configuration rule of a grant-free resource (for example, a time domain period of the grant-free resource) that is sent by the network device, or may determine the sequence number of the grant-free transmission time unit by maintaining a counter of a grant-free transmission time unit. In an embodiment, the network device may configure a plurality of sets of grant-free resources for the terminal device. As shown in FIG. 14, the network device configures two sets of grant-free resources GFRC1 and GFRC2 for the terminal device. Time domain periods of the first set of grant-free resources GFRC1 and the second set of grant-free resources GFRC2 are the same, and the time domain periods thereof are all 5 (to be specific, a grant-free resource is configured in every five transmission time units). However, time domain start locations of the first set of grant-free resources GFRC1 and the second set of grant-free resources GFRC2 are different. When the network device configures a plurality of sets of grant-free transmission resources for the terminal device, the terminal device may maintain a counter of a grant-free transmission time unit for each set of grant-free resources.

Figure 9:
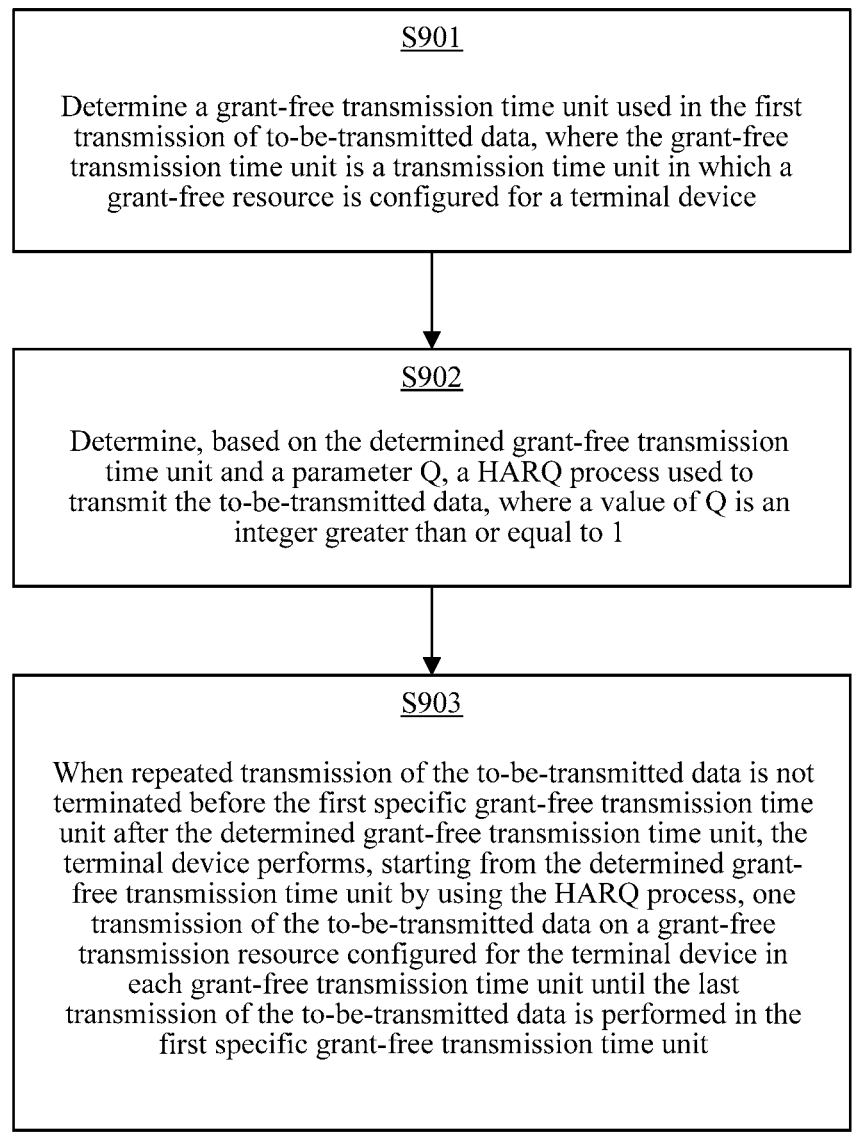
FIG. 9 is a schematic flowchart of a method for repeated transmission according to an embodiment of the present invention.

For a case in which grant-free resources are inconsecutive in time, an embodiment of the present invention provides a method for repeated transmission. As shown in FIG. 9, in the method, each transmission in repeated transmissions is performed in a grant-free transmission time unit. The method includes the following steps.

Step S901: Determine a grant-free transmission time unit used in the first transmission of to-be-transmitted data, where the grant-free transmission time unit is a transmission time unit in which a grant-free resource is configured for a terminal device.

Step S902: Determine, based on the determined grant-free transmission time unit and a parameter Q, a HARQ process used to transmit the to-be-transmitted data, where a value of Q is an integer greater than or equal to 1.

In an embodiment, step S902 may specifically include: determining a HARQ process number based on a sequence number (for example, "t+1" in FIG. 8) of the determined grant-free transmission time unit, the parameter Q, and a maximum quantity of HARQ processes supported by a grant-free resource of the terminal device. In a specific implementation, the HARQ process number may be determined according to a formula (5) or a formula (6).

The formula (5) is:

$$\text{HARQ\_ID} = \text{floor}(GF\_T\_\text{Index}/Q) \bmod N\_GF; \text{ and}$$

the formula (6) is:

$$\text{HARQ\_ID} = \text{floor}(GF\_T\_\text{Index}/Q) \bmod N\_GF + H\_\text{offset\_value, where}$$

floor( ) indicates rounding down, HARQ_ID is the HARQ process number, GF_T_Index is the sequence number of the grant-free transmission time unit, N_GF is the maximum quantity of HARQ processes supported by the grant-free resource of the terminal device, and H_offset_value is a preset process number offset value.

In another embodiment, step S902 may specifically include: determining a HARQ process number based on an index (for example, "$n_{t+1}$" in FIG. 8) of the determined grant-free transmission time unit, the parameter Q, and a maximum quantity of supported HARQ processes. In a specific implementation, the HARQ process number may be determined according to a formula (7) or a formula (8).

The formula (7) is:

$$\text{HARQ\_ID} = \text{floor}(T\_\text{Index}/(P*Q)) \bmod N\_GF; \text{ and}$$

the formula (8) is:

$$\text{HARQ\_ID} = \text{floor}(T\_\text{Index}/(P*Q)) \bmod N\_GF + H\_\text{offset\_value, where}$$

floor( ) indicates rounding down, HARQ_ID is the HARQ process number, T_Index is the index of the grant-free transmission time unit, N_GF is the maximum quantity of HARQ processes supported by a grant-free resource of the terminal device, H_offset_value is a preset process number offset value, P is a time domain period of the grant-free resource, and P is an integer greater than or equal to 1.

In the foregoing embodiment, P, N_GF, and H_offset_value may be predefined (for example, specified in a standard), may be specified by a network device and notified to the terminal device by using signaling, or may be determined through negotiation between a network device and the terminal device. When H_offset_value is specified by the network device, the network device may add P, N_GF, H_offset_value, and the parameter Q to a same piece of signaling for sending to the terminal device, or may add P, N_GF, and H_offset_value to another piece of signaling for sending to the terminal device.

When the grant-free resource configured by the network device for the terminal device includes a plurality of frequency resources, and a parameter Q is specified for each frequency resource, a HARQ process number corresponding to each frequency resource in a grant-free transmission time unit GF_T_Index (or T_index) is calculated by using any one of the foregoing formulas (5) to (8) based on the parameter Q corresponding to each frequency resource. When the HARQ process number corresponding to each frequency resource is calculated by using the formula (6) or (8), different frequency resources may correspond to different preset process number offset values H_offset_value. H_offset_value corresponding to each frequency resource may be predefined (for example, specified in a standard), may be specified by the network device and notified to the terminal device by using signaling, or may be determined through negotiation between the terminal device and the network device. When H_offset_value is specified by the network device, the network device may add H_offset_value corresponding to each frequency resource and the parameter Q to a same piece of signaling for sending to the terminal device, or may add H_offset_value corresponding to each frequency resource to another piece of signaling for sending to the terminal device. In another embodiment, the network device may specify a parameter Q for a grant-free resource including a plurality of frequency resources. When the network device configures a plurality of sets of grant-free resources for the terminal device, the network device may further specify a parameter Q, H_offset_value, and N_GF for each set of grant-free resources. The terminal device may select one set of grant-free resources from the plurality of sets of grant-free resources for repeated transmissions of the to-be-transmitted data, and calculate a HARQ process number corresponding to a grant-free transmission time unit GF_T_Index (or T_index) in the set of grant-free resources by using any one of the foregoing formulas (5) to (8) based on a parameter Q, H_offset_value, and N_GF corresponding to the set of grant-free resources.

Step S903: When repeated transmission of the to-be-transmitted data is not terminated before the first specific grant-free transmission time unit after the determined grant-free transmission time unit, the terminal device performs, starting from the determined grant-free transmission time unit by using the HARQ process, one transmission of the to-be-transmitted data on a grant-free transmission resource configured for the terminal device in each grant-free transmission time unit until the last transmission of the to-be-transmitted data is performed in the first specific grant-free transmission time unit.

In step S903, the specific grant-free transmission time unit is specifically a grant-free transmission time unit periodically appearing in grant-free transmission time units, and a period of the specific grant-free transmission time unit is Q grant-free transmission time units. To be specific, the specific grant-free transmission time unit is a transmission time unit in which a grant-free resource is configured, and two adjacent specific grant-free transmission time units are separated by (Q−1) grant-free transmission time units. As shown in FIG. 8, it is assumed that Q=5, and a grant-free transmission time unit $n_t$ (a $t^{th}$ grant-free transmission time unit of the terminal device) is a specific grant-free transmission time unit. In this case, a next specific grant-free transmission time unit is a grant-free transmission time unit $n_{t+5}$ (namely, a $(t+5)^t$ grant-free transmission time unit of the terminal device), and there are four grant-free transmission time units between the grant-free transmission time unit $n_t$ and the grant-free transmission time unit $n_{t+5}$.

In step S903, each transmission of the to-be-transmitted data is performed in a grant-free transmission time unit, and a grant-free resource configured for the terminal device in the grant-free transmission time unit is used. When a plurality of grant-free resources are configured in one grant-free transmission time unit, the terminal device may select one or more grant-free resources from the plurality of grant-free resources, or even select all of the grant-free resources configured for the terminal device in the grant-free transmission time unit, to transmit the to-be-transmitted data.

In step S903, the terminal device determines whether a current grant-free transmission time unit is the first specific grant-free transmission time unit, and if the current grant-free transmission time unit is the first specific grant-free transmission time unit, terminates a repeated transmission procedure of the to-be-transmitted data after performing transmission of the to-be-transmitted data in the current grant-free transmission time unit, or if the current grant-free transmission time unit is not the first specific grant-free transmission time unit, continues to perform one transmission of the to-be-transmitted data in a next grant-free transmission time unit.

That the terminal device determines whether a current grant-free transmission time unit is the first specific grant-free transmission time unit includes:

performing a modulo Q operation on a sequence number of the current grant-free transmission time unit; and if a value obtained by performing the modulo Q operation is equal to 0 or a preset time offset value, the current grant-free transmission time unit is the specific grant-free transmission time unit; or if a value obtained by performing the modulo Q operation is equal to neither 0 nor a preset time offset value, the current grant-free transmission time unit is not the specific grant-free transmission time unit.

The preset time offset value may be predefined (for example, specified in a standard), or may be specified by the network device and notified to the terminal device by using signaling. When the preset time offset value is specified by the network device, the network device may add the preset time offset value and the parameter Q to a same piece of signaling for sending to the terminal device, or may add the preset time offset value to another piece of signaling for sending to the terminal device.

In the repeated transmissions, one redundancy version of the to-be-transmitted data may be transmitted each time, and redundancy versions in different transmissions may be the same or different.

In an embodiment, a redundancy version is associated with a grant-free transmission time unit. To be specific, in a grant-free transmission time unit, the terminal device can send only a redundancy version related to the grant-free transmission time unit, and cannot send another version. In this embodiment, the method shown in FIG. 9 may further include: determining a redundancy version of the to-be-transmitted data in each transmission based on an index of a grant-free transmission time unit in which each transmission in the repeated transmissions is performed or based on a sequence number of a grant-free transmission time unit in which each transmission in the repeated transmissions is performed. Because the redundancy version is associated with the grant-free transmission time unit, the network device can accurately learn of redundancy version information of received data based on only a grant-free transmission time unit in which the data is received. An association relationship between a redundancy version and a grant-free transmission time unit may be predefined (for example, specified in a standard), or may be specified by the network device and notified to the terminal device by using signaling. The network device may add the association relationship between the redundancy version and the grant-free transmission time unit and the parameter Q to a same piece of signaling for sending to the terminal device, or may add the association relationship between the redundancy version and the grant-free transmission time unit to another piece of signaling for sending to the terminal device.

In an embodiment, a redundancy version is associated with each grant-free transmission time unit in the period of the specific grant-free transmission time unit. It can be learned from the foregoing embodiment that the period of the specific grant-free transmission time unit includes Q grant-free transmission time units (including one specific grant-free transmission time unit). For example, as shown in FIG. 8, the period of the specific grant-free transmission time unit includes grant-free transmission time units $n_{t+1}$, $n_{t+2}$, $n_{t+3}$, $n_{t+4}$, and $n_{t+5}$. When the to-be-transmitted data is transmitted by using a grant-free resource in the Q grant-free transmission time units in which grant-free resources are configured, in each grant-free transmission time unit, only a redundancy version associated with the grant-free transmission time unit can be transmitted. Version numbers of redundancy versions associated with the grant-free transmission time units in the period of the specific grant-free transmission time unit may be predefined (for example, specified in a standard), or may be specified by the network device and notified to the terminal device by using signaling. The network device may specify a version number sequence of the redundancy versions associated with the grant-free transmission time units in the period of the specific grant-free transmission time unit, for example, the version number sequence $SRv=(RV_1, RV_2, \ldots, RV_Q)$, where $RV_1$ indicates a version number of a redundancy version associated with the first grant-free transmission time unit in the period of the specific grant-free transmission time unit, $RV_2$ indicates a version number of a redundancy version associated with the second grant-free transmission time unit in the period of the specific grant-free transmission time unit, and by analogy, $RV_Q$ indicates a version number of a redundancy version associated with the $Q^{th}$ configured grant-free transmission time unit (namely, the specific grant-free transmission time unit) in the period of the specific grant-free transmission time unit.

In the repeated transmissions, modulation and coding schemes (MCS) used in different transmissions may be the same or different.

In an embodiment, an MCS is associated with a grant-free transmission time unit. To be specific, when sending data in a grant-free transmission time unit, the terminal device can use only an MCS associated with the grant-free transmission time unit, and cannot use another MCS. In this embodiment, the method shown in FIG. 9 may further include: determining, based on the index of the grant-free transmission time unit in which each transmission in the repeated transmissions is performed or the sequence number of the grant-free transmission time unit, an MCS that needs to be used in each transmission. Because the MCS is associated with the grant-free transmission time unit, the network device can accurately learn of, based on only a grant-free transmission time unit in which data is received, an MCS corresponding to the received data. An association relationship between an MCS and a grant-free transmission time unit may be predefined (for example, specified in a standard), or may be specified by the network device and notified to the terminal device by using signaling. The network device may add the association relationship between the MCS and the grant-free transmission time unit and the parameter Q to a same piece of signaling for sending to the terminal device, or may add the association relationship between the MCS and the grant-free transmission time unit to another piece of signaling for sending to the terminal device.

In an embodiment, an MCS is associated with each grant-free transmission time unit in the period of the specific grant-free transmission time unit. When the to-be-transmitted data is transmitted by using a grant-free resource in the Q grant-free transmission time units in the period of the specific grant-free transmission time unit, in each grant-free transmission time unit, only an MCS associated with the grant-free transmission time unit can be used. Indexes of MCSs associated with the grant-free transmission time units in which grant-free resources are configured and that are in the period of the specific grant-free transmission time unit may be predefined (for example, specified in a standard), or may be specified by the network device and notified to the terminal device by using signaling. The network device may specify an MCS index sequence in the period of the specific grant-free transmission time unit, for example, the MCS index sequence $S_{MCS}=(MCS_1, MCS_2, \ldots, MCS_Q)$, where $MCS_1$ indicates an index of an MCS associated with the first grant-free transmission time unit in the period of the specific grant-free transmission time unit, $MCS_2$ indicates an index of an MCS associated with the second grant-free transmission time unit in the period of the specific grant-free transmission time unit, and by analogy, $MCS_Q$ indicates an index of an MCS associated with the $Q^{th}$ grant-free transmission time unit in the period of the specific grant-free transmission time unit.

In an embodiment, if step S901 includes: if the first grant-free transmission time unit that can be used in the first transmission of the to-be-transmitted data is the specific grant-free transmission time unit, the terminal device uses the first grant-free transmission time unit after the specific grant-free transmission time unit as a grant-free transmission time unit used in the first transmission of the to-be-transmitted data.

It may be understood that in the foregoing embodiment, although the method for repeated transmission provided in this embodiment of the present invention is described by using an example in which the grant-free resources of the terminal device are inconsecutive in time domain, the method is also applicable to a scenario in which the grant-free resources of the terminal device are consecutive in time domain, and no change needs to be made when the method for repeated transmission is applied to the scenario in which the grant-free resources are consecutive in time domain.

Figure 10:
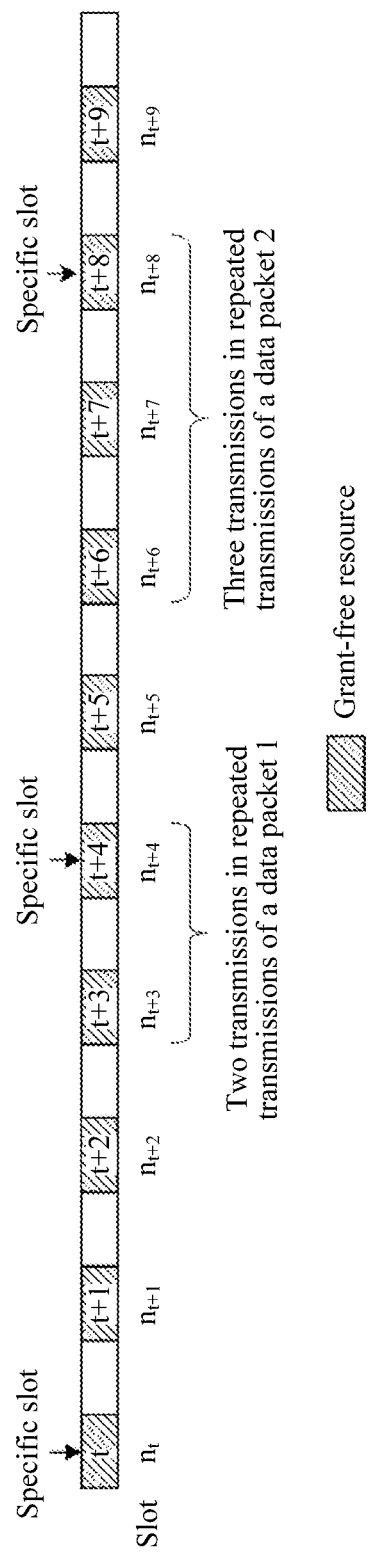
FIG. 10 is a schematic diagram of a repeated transmission process according to an embodiment of the present invention.

This application further provides a specific example of the method provided in the embodiment shown in FIG. 9. In the example, each transmission in repeated transmissions is performed in a grant-free transmission time unit in which a grant-free resource is configured for a terminal device, and is performed on the grant-free resource in the grant-free transmission time unit. The example is further described by using an example in which the transmission time unit in FIG. 8 is specifically a slot. As shown in FIG. 10, the method for repeated transmission in this example includes the following steps:

Step S1001: The terminal device performs the first transmission in repeated transmissions of to-be-transmitted data on a grant-free resource in a $(t+1)^{th}$ grant-free slot $n_{t+1}$ ($n_{t+1}>0$), sets k=1, and performs step S1002.

Step S1002: The terminal device determines whether a $(t+1+k-1)^{th}$ grant-free slot $n_{t+1+k-1}$ is a specific grant-free slot, and if yes, performs step S1004, otherwise, performs step S1003.

Step S1003: The terminal device performs the $(k+1)^{th}$ transmission in the repeated transmissions of the to-be-transmitted data in a $(t+1+k)^{th}$ grant-free slot $n_{t+1+k}$, sets k=k+1, and performs step S1002.

Step S1004: Terminate a repeated transmission procedure. To be specific, the terminal device performs k transmissions of the to-be-transmitted data only in the $(t+1)^{th}$ grant-free slot to the $(t+1+k-1)^{th}$ grant-free slot, and does not perform the repeated transmissions of the to-be-transmitted data in the $(t+1+k)^{th}$ grant-free slot and following slots; and the repeated transmissions end.

In this embodiment, the specific grant-free slot is a specific example of the specific grant-free transmission time unit, and a period in which the specific grant-free slot appears is Q slots in which grant-free resources are configured. For a value of Q, refer to the related description in the embodiment shown in FIG. 9.

In step S1002, the terminal device may determine, by using the following method, whether the $(t+1+k-1)^{th}$ grant-free slot $n_{t+1+k-1}$ is the specific slot.

It is assumed that a sequence number of the grant-free slot $n_{t+1+k-1}$ is Index_GF=t+1+k−1. If GF_T_Index=t+1+k−1 satisfies the following formula (9) or formula (10), the terminal device may consider that the $(t+1+k-1)^{th}$ grant-free slot $n_{t+1+k-1}$ is the specific slot, and after performing one transmission of the to-be-transmitted data in the slot, terminate the repeated transmission procedure. Otherwise, the terminal device determines that the $(t+1+k-1)^{th}$ grant-free slot $n_{t+1+k-1}$ is not the specific slot.

The formula (9) is GF_T_Index mod Q=0; and the formula (10) is GF_T_Index mod Q=T_offset_value, where T_offset_value is the preset time offset value mentioned in the embodiments in FIG. 9 and FIG. 3, a value of T_offset_value is an integer greater than 0 and less than Q, and T_offset_value may be predefined (for example, specified in a standard), or may be specified by a network device and notified to the terminal device by using signaling.

FIG. 10 shows a specific example of the method shown in FIG. 9. In the example, Q=4, and a maximum quantity K of repeated transmissions supported by the terminal device is also 4. Repeated transmissions of a data packet 1 are used as an example. The terminal device starts the first transmission in the repeated transmission in a $(t+3)^{th}$ grant-free slot $n_{t+3}$, and when determining that a $(t+4)^{th}$ grant-free slot $n_{t+4}$ is a specific grant-free slot, the terminal device terminates a repeated transmission procedure after performing one transmission of the data packet 1 in the grant-free slot $n_{t+4}$. To be specific, the terminal device no longer performs the remaining two transmissions in the repeated transmissions in a $(t+5)^{th}$ grant-free slot $n_{t+5}$ and a $(t+6)_{th}$ grant-free slot $n_{t+6}$.

In step S1001 and step S1003, when the terminal device performs one transmission in the repeated transmissions of the to-be-transmitted data, the following steps are included:

The terminal device determines, based on any one of the formulas (5) to (8) in the foregoing embodiment, a HARQ process ID of a HARQ process used in the current transmission; and sends the to-be-sent data to the network device by using the process corresponding to the HARQ process ID.

Figure 11:
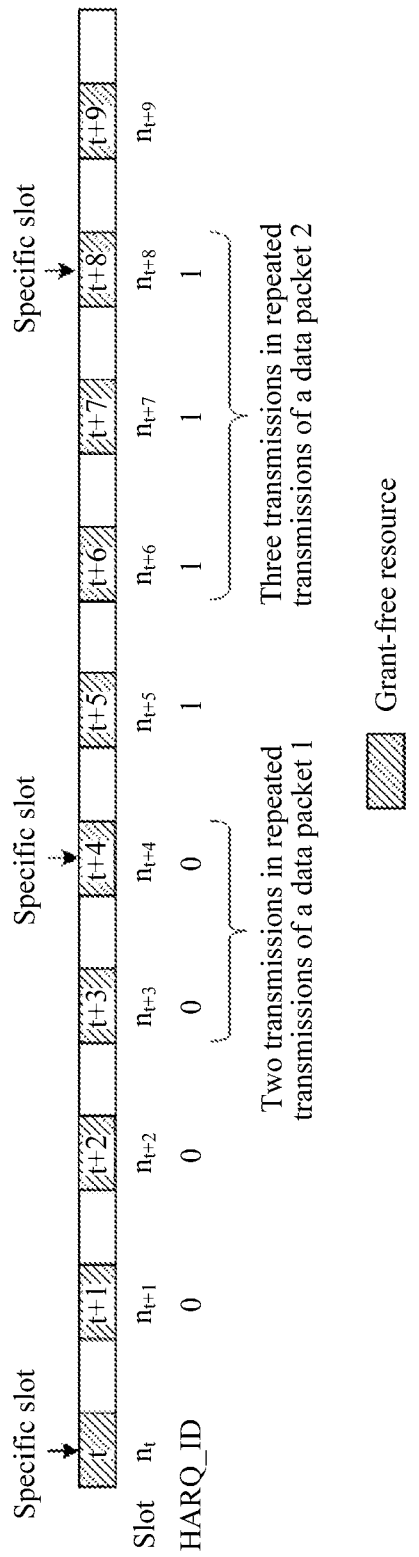
FIG. 11 is a schematic diagram of a repeated transmission process according to another embodiment of the present invention.

FIG. 11 shows an example of determining, by using any one of the formulas (5) to (8), a number of a HARQ process used in each slot. In the example, Q=4, and a maximum quantity K of repeated transmissions supported by the terminal device is also 4. It can be learned from FIG. 11 that the terminal device performs the first two transmissions in the repeated transmissions of the data packet 1 by using a HARQ process 0, and performs the first three transmissions in repeated transmissions of a data packet 2 by using a HARQ process 1. Based on calculation by using the formulas (5) to (8), it may be learned that HARQ_IDs corresponding to grant-free transmission time units in the period of the specific grant-free transmission time unit are the same.

When detecting a specific transmission in repeated transmissions of a specific data packet of the terminal device in the $(t+k)^{th}$ grant-free slot of the terminal device, the network device also calculates, according to any one of the formulas (5) to (8), a number of a HARQ process used for the data packet sent in the slot t+k.

In another embodiment, the terminal device does not need to calculate a HARQ process number in each transmission, and only needs to calculate a HARQ process number in the first transmission, and performs each subsequent transmission of the to-be-transmitted data by using a process corresponding to the HARQ process number until the first specific slot after the first transmission.

Figure 15:
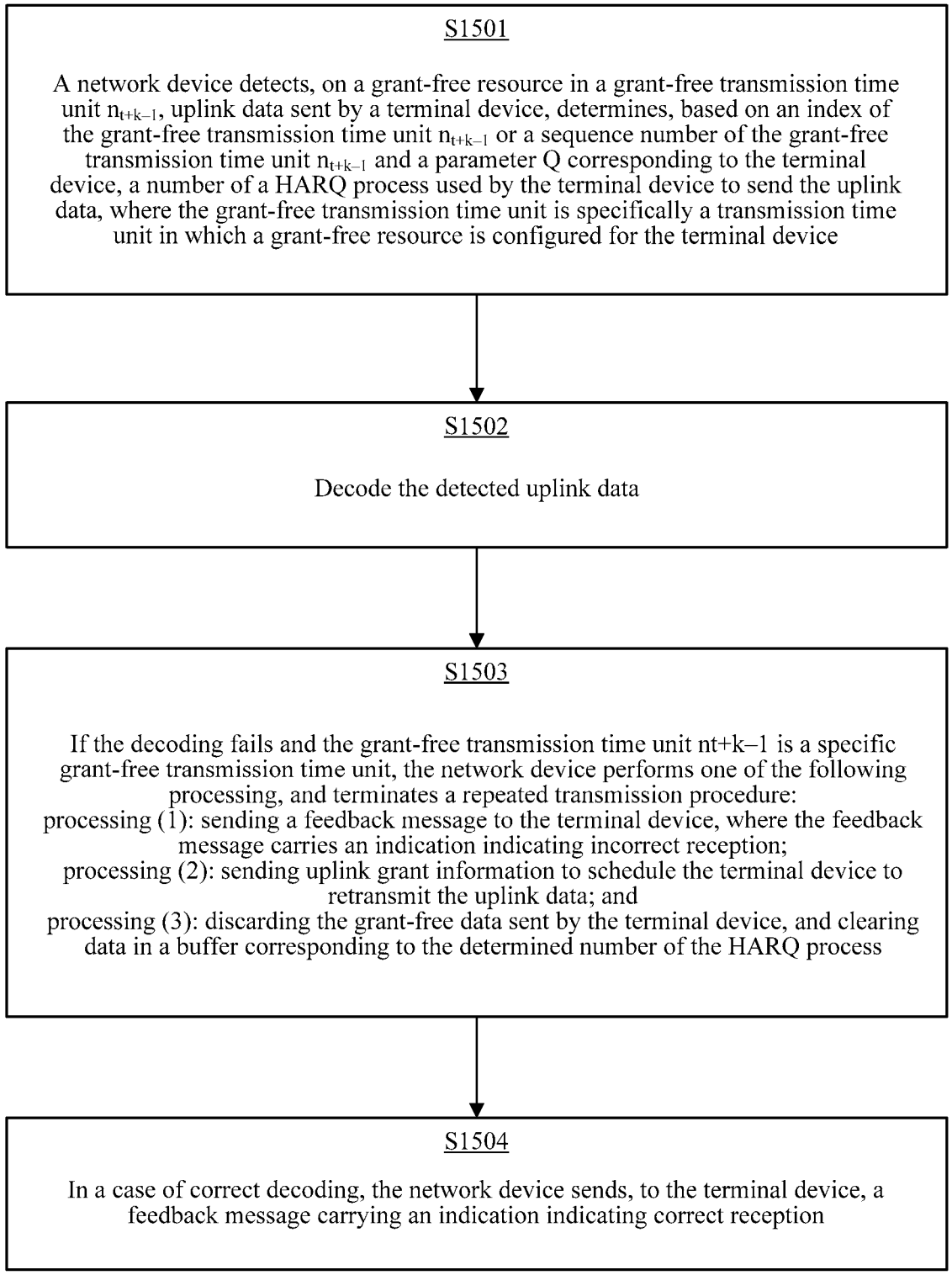
FIG. 15 is a schematic flowchart of a method for repeated transmission according to an embodiment of the present invention.

This application further provides a method for repeated transmission. As shown in FIG. 15, the method may be applied to the network device 102 in the network shown in FIG. 2, and the method includes the following steps.

Step S1501: The network device detects, on a grant-free resource in a grant-free transmission time unit $n_{t+k-1}$, uplink data sent by a terminal device, determines, based on an index of the grant-free transmission time unit $n_{t+k-1}$ or a sequence number of the grant-free transmission time unit $n_{t+k-1}$ and a parameter Q corresponding to the terminal device, a number of a HARQ process used by the terminal device to send the uplink data, where the grant-free transmission time unit is specifically a transmission time unit in which a grant-free resource is configured for the terminal device.

In an embodiment, the network device may detect, by detecting a reference signal (or which is referred to as a pilot signal), whether the terminal device sends uplink data on the grant-free resource in the grant-free transmission time unit $n_{t+k-1}$, and determine, based on a detected reference signal, a terminal device that sends detected data.

In a grant-free transmission mechanism, the network device configures a reference signal for the terminal device, and each terminal device performs uplink transmission on a grant-free resource by using a reference signal configured for the terminal device. During uplink transmission, the terminal device sends uplink data and the reference signal configured for the terminal device to the network device on the grant-free resource. The network device detects the reference signal on the grant-free resource configured for the terminal device, and if the reference signal is detected, the network device considers that there is a terminal device that sends uplink data on the grant-free resource, and further determines, based on the detected reference signal, a terminal device that sends the uplink data. A reference signal configured by the network device for one terminal device may be different from or the same as a reference signal configured for another terminal device. When a reference signal configured by the network device for one terminal device is the same as a reference signal configured for another terminal device, the network device may configure different grant-free resources (for example, grant-free time-frequency resources) for terminal devices having a same reference signal, and the network device can determine a terminal device from which uplink data comes provided that combinations of reference signals and grant-free time-frequency resources corresponding to any two terminal devices are different.

The network device may calculate the number of the HARQ process according to any one of the formulas (1), (2), (5), (6), (7), and (8) in the foregoing embodiments, and details are not described herein again.

When the network device configures a plurality of sets of grant-free resources for the terminal device, and specifies different values of the parameter Q for the plurality of sets of grant-free resources, the network device may determine, based on the grant-free resource on which the uplink data is detected, a value of the parameter Q corresponding to the grant-free resource, and calculate the number of the HARQ process by using the value of the parameter Q corresponding to the grant-free resource.

Step S1502: Decode the detected uplink data.

In an embodiment, step S1502 is specifically: decoding only the uplink data received in the grant-free transmission time unit $n_{t+k-1}$. In another embodiment, step S1502 is specifically: decoding the uplink data received in the grant-free transmission time unit $n_{t+k-1}$ and data in a buffer corresponding to the number of the HARQ process.

Step S1503: In a case of incorrect decoding, the network device determines whether the grant-free transmission time unit $n_{t+k-1}$ is a specific grant-free transmission time unit. In this embodiment, the specific grant-free transmission time unit is specifically a grant-free transmission time unit periodically appearing in grant-free transmission time units, and a period of the specific grant-free transmission time unit is Q grant-free transmission time units.

For determining, by the network device, whether a current grant-free transmission time unit is the specific grant-free transmission time unit, refer to the formulas (3), (4), (9), and (10) in the foregoing embodiments and the related description. Details are not described herein again.

If the grant-free transmission time unit $n_{t+k-1}$ is the specific grant-free transmission time unit, the network device performs one of the following types of processing, and terminates a repeated transmission procedure:

processing (1): sending a feedback message to the terminal device, where the feedback message carries an indication indicating incorrect reception;

processing (2): sending uplink grant information to schedule the terminal device to retransmit the uplink data; and processing (3): discarding the grant-free data sent by the terminal device, and clearing the data in the buffer corresponding to the determined number of the HARQ process.

If the grant-free transmission time unit $n_{t+k-1}$ is not the specific grant-free transmission time unit, the network device receives the uplink data again in a next grant-free transmission time unit of the terminal device. It should be noted that a same redundancy version or a different redundancy version of the uplink data may be received again.

In an embodiment, the feedback message further carries the determined number of the HARQ process and/or an identifier of the terminal device.

In an embodiment, the uplink grant information includes time-frequency resource information used for retransmitting the uplink data. In another embodiment, the uplink grant information may alternatively include one or more of the following information: the determined number of the HARQ process, an identifier of the terminal device, a redundancy version number, an MCS, a TBS, a power control parameter, reference signal information, and the like.

In an embodiment, the method for repeated transmission shown in FIG. 15 may further include the following step:

Step S1504: In a case of correct decoding, the network device sends, to the terminal device, a feedback message carrying an indication indicating correct reception.

In an embodiment, when feeding back the indication indicating correct reception, the network device may further add the determined number of the HARQ process and/or the identifier of the terminal device to the feedback message carrying the indication indicating correct reception.

In another embodiment, in the case of correct decoding, the network device may not feed back any information to the terminal device, but continue to wait for the terminal device to perform the remaining transmissions in repeated transmissions, and only when the first specific grant-free transmission time unit after the transmission time unit in which the uplink data is detected arrives, send, to the terminal device, the feedback message carrying the indication indicating correct reception after the first specific grant-free transmission time unit.

Figure 12:
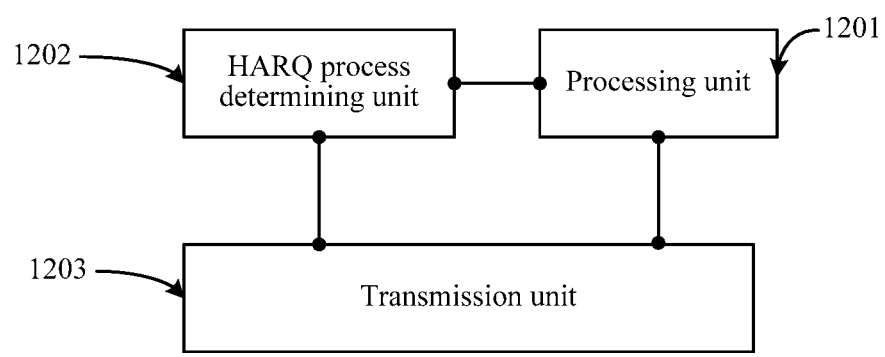
FIG. 12 is a schematic structural diagram of a terminal device according to an embodiment of the present invention.

An embodiment of the present invention further provides a terminal device configured to perform the transmission method provided in the foregoing embodiments. As shown in FIG. 12, the device includes:

a processing unit 1201, configured to determine a grant-free transmission time unit used in the first transmission of to-be-transmitted data, where the grant-free transmission time unit is a transmission time unit in which a grant-free resource is configured for the terminal device;

a HARQ process determining unit 1202, configured to determine, based on the determined grant-free transmission time unit and a parameter Q, a HARQ process used to transmit the to-be-transmitted data, where a value of Q is an integer greater than or equal to 1; and a transmission unit 1203, configured to: when repeated transmission of the to-be-transmitted data is not terminated before the first specific grant-free transmission time unit after the determined grant-free transmission time unit, perform, starting from the determined grant-free transmission time unit by using the HARQ process, one transmission of the to-be-transmitted data on a grant-free transmission resource configured for the terminal device in each grant-free transmission time unit until the last transmission of the to-be-transmitted data is performed in the first specific grant-free transmission time unit, where the specific grant-free transmission time unit is specifically a grant-free transmission time unit periodically appearing in grant-free transmission time units, and a period of the specific grant-free transmission time unit is Q.

For specific implementation of the processing unit 1201, refer to step S901 and the related part thereof in the foregoing embodiment; for specific implementation of the HARQ process determining unit 1202, refer to step S902 and the related part thereof in the foregoing embodiment; and for specific implementation of the transmission unit 1203, refer to step S903 and the related part thereof in the foregoing embodiment.

Figure 13:
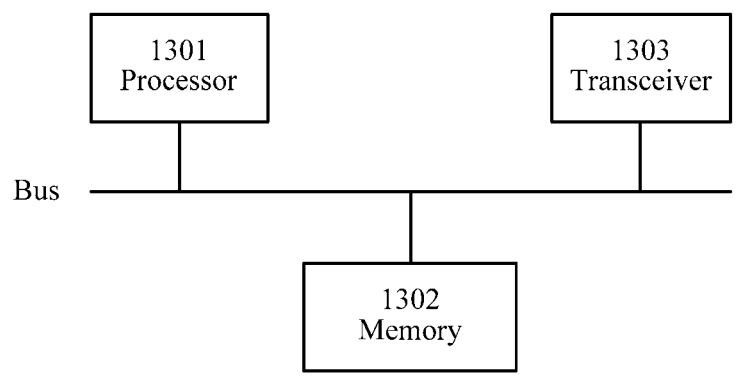
FIG. 13 is a schematic structural diagram of a terminal device according to another embodiment of the present invention.

As shown in FIG. 13, an embodiment of the present invention further provides a terminal device. The terminal device includes a memory 1302, a transceiver 1303, and a processor 1301.

The memory 1302 is configured to store a program and data. The memory may be a random access memory (RAM), a read-only memory (ROM), or a flash memory. The memory 1302 may be independently located in a communications device, or may be located inside the processor 1301.

The transceiver 1303 may be used as a separate chip, or may be a transceiver circuit or used as an input/output interface in the processor 1301. The transceiver 1303 is configured to receive data sent by a network device and various types of signaling in the foregoing embodiments, and is further configured to send the to-be-transmitted data in the foregoing embodiments. For example, the transceiver 1303 is configured to send the to-be-transmitted data in step S303 in the embodiment shown in FIG. 3 and step S903 in the embodiment shown in FIG. 9.

The processor 1301 is configured to execute program code stored in the memory 1302, and when the program code is executed, the processor 1301 is configured to perform step S301 and step S302 in the embodiment shown in FIG. 3 and step S901 and step S902 in the embodiment shown in FIG. 9.

Optionally, the transceiver 1303, the memory 1302, and the processor 1301 are connected by using a bus.

For specific implementation of each device in the terminal device 13, refer to the method embodiments shown in FIG. 3, FIG. 4, and FIG. 9 and the related description. Details are not described herein again.

Figure 16:
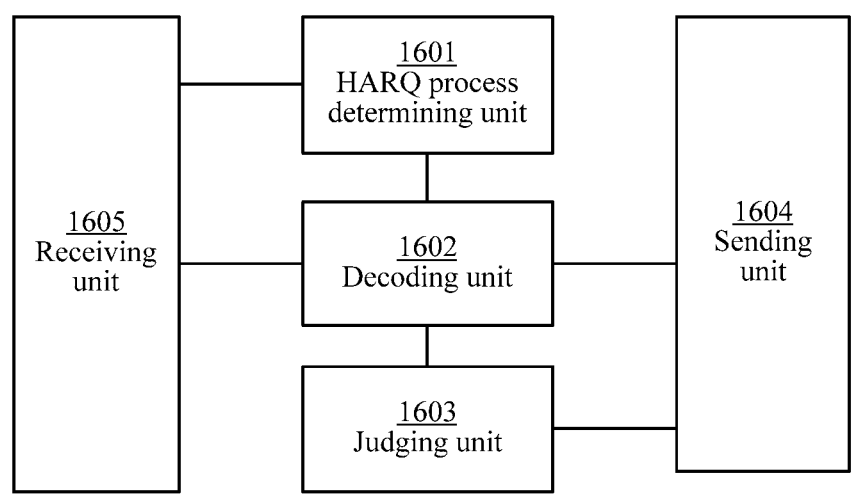
FIG. 16 is a schematic structural diagram of a network device according to an embodiment of the present invention.

As shown in FIG. 16, an embodiment of the present invention further provides a network device. The network device includes:

a HARQ process determining unit 1601, configured to determine, based on an index of a grant-free transmission time unit $n_{t+k-1}$ in which uplink data sent by a terminal device is detected or a sequence number of the grant-free transmission time unit $n_{t+k-1}$ and a parameter Q corresponding to the terminal device, a number of a HARQ process used by the terminal device to send the uplink data, where the grant-free transmission time unit is specifically a transmission time unit in which a grant-free resource is configured for the terminal device;

a decoding unit 1602, configured to decode the detected uplink data;

a judging unit 1603, configured to: when the uplink data fails to be decoded, determine whether the grant-free transmission time unit $n_{t+k-1}$ is a specific grant-free transmission time unit;

a sending unit 1604, configured to: when the uplink data fails to be decoded and the grant-free transmission time unit $n_{t+k-1}$ is the specific grant-free transmission time unit, send, to the terminal device, a feedback message carrying an indication indicating correct reception or uplink grant information; and a receiving unit 1605, configured to: when the uplink data fails to be decoded and the grant-free transmission time unit $n_{t+k-1}$ is the specific grant-free transmission time unit, continue to receive the uplink data in a next grant-free transmission time unit of the terminal device.

For specific implementation of the HARQ process determining unit 1601, refer to step S1501 and the related part thereof in the foregoing embodiment; for specific implementation of the decoding unit 1602, refer to step S1502 and the related part thereof in the foregoing embodiment; for specific implementation of the judging unit 1603 and the sending unit 1604, refer to step S1503 and the related part thereof in the foregoing embodiment; and for specific implementation of the receiving unit 1605, refer to step S1504 and the related part thereof in the foregoing embodiment.

Figure 17:
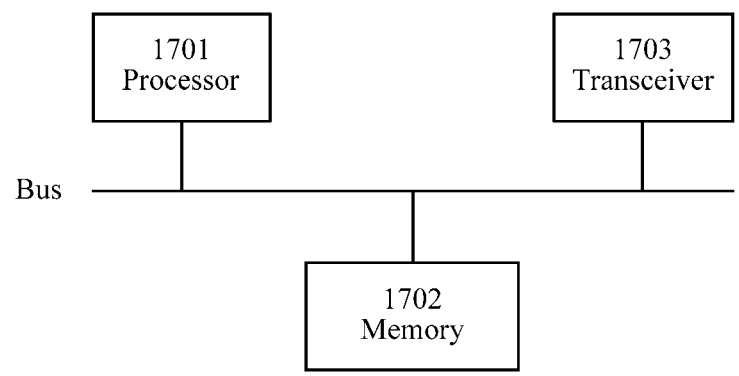
FIG. 17 is a schematic structural diagram of a network device according to another embodiment of the present invention.

As shown in FIG. 17, an embodiment of the present invention further provides a terminal device. The terminal device includes a memory 1702, a transceiver 1703, and a processor 1701.

The memory 1702 is configured to store a program and data. The memory may be a random access memory (RAM), a read-only memory (ROM), or a flash memory. The memory 1702 may be independently located in a communications device, or may be located inside the processor 1701.

The transceiver 1703 may be used as a separate chip, or may be a transceiver circuit or used as an input/output interface in the processor 1701. The transceiver 1703 is configured to receive data sent by a network device and various types of signaling in the foregoing embodiments, and is further configured to send the to-be-transmitted data in the foregoing embodiments. For example, the transceiver 1703 is configured to perform the sending processing in step S1503 and the receiving processing in step S1504 in the embodiment shown in FIG. 15.

The processor 1701 is configured to execute program code stored in the memory 1702, and when the program code is executed, the processor 1701 is configured to perform the determining processing in steps S1501, S1502, and S1503 in the embodiment shown in FIG. 15.

Optionally, the transceiver 1703, the memory 1702, and the processor 1701 are connected by using a bus.

Figure 19:
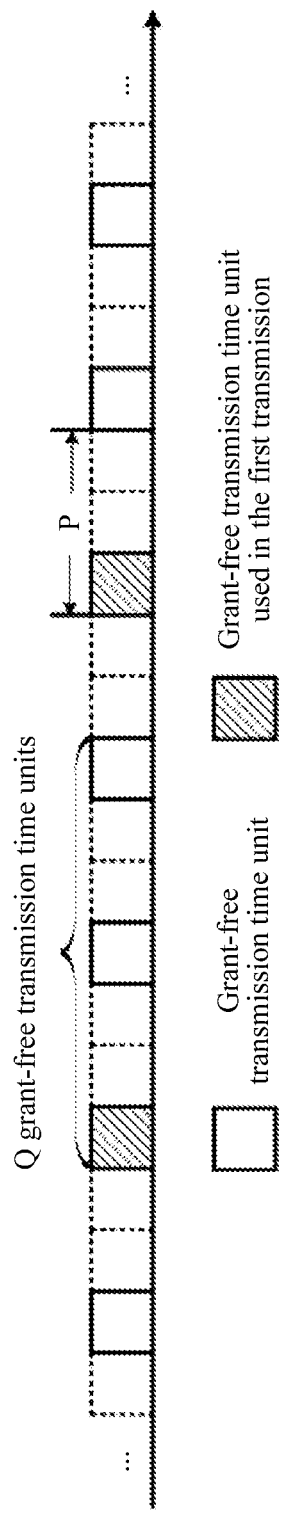
FIG. 19 is a schematic diagram of distribution of grant-free transmission time units according to an embodiment of the present invention.

For specific implementation of each device in the terminal device, refer to the method embodiment shown in FIG. 19 and the related description. Details are not described herein again.

Figure 18:
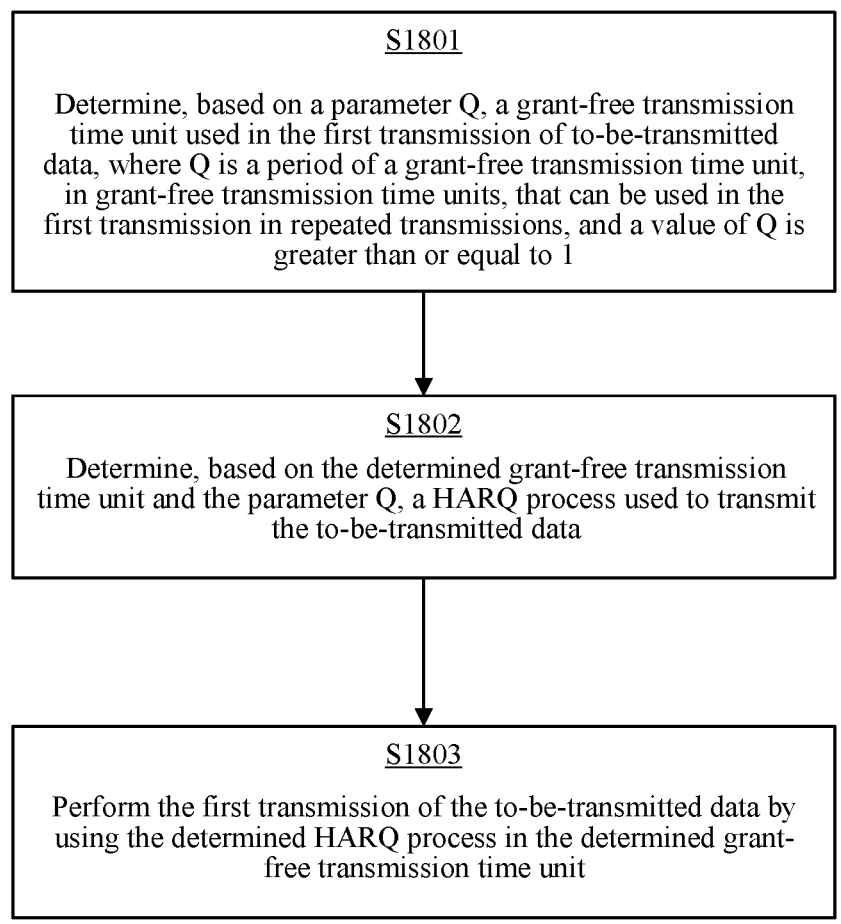
FIG. 18 is a schematic flowchart of a method for repeated transmission according to another embodiment of the present invention.

Another embodiment of the present invention provides another method for repeated transmission. As shown in FIG. 18, in the method, each transmission in repeated transmissions is performed in a grant-free transmission time unit. The method includes the following steps.

Step S1801: Determine, based on a parameter Q, a grant-free transmission time unit used in the first transmission of to-be-transmitted data, where Q is a period of a grant-free transmission time unit, in grant-free transmission time units, that can be used in the first transmission in repeated transmissions, and a value of Q is greater than or equal to 1. For a grant-free transmission time unit in which a grant-free transmission resource (for example, a specific set of grant-free resources in the foregoing embodiment) configured in a specific grant-free transmission resource configuration of a terminal device is located, not all grant-free transmission time units can be used to perform the first transmission in the repeated transmissions, but only some grant-free transmission time units can be used to perform the first transmission in the repeated transmissions. In other words, the first transmission in the repeated transmissions can be performed only in some specific grant-free transmission time units. In this embodiment, the parameter Q is a parameter used to determine grant-free time units that can be used to perform the first transmission in the repeated transmissions. In an implementation, Q is a period of a grant-free transmission time unit, in grant-free transmission time units, that can be used in the first transmission in the repeated transmissions, to be specific, two adjacent grant-free transmission time units that can be used in the first transmission in the repeated transmissions are separated by (Q−1) grant-free transmission time units. In another implementation, Q is a period, in a time domain resource, of a grant-free transmission time unit that can be used in the first transmission in the repeated transmissions. For example, the period, in the time domain resource, of the grant-free transmission time unit used in the first transmission in the repeated transmissions is Q*P transmission time units, to be specific, two adjacent grant-free transmission time units used in the first transmission in the repeated transmissions are separated by (Q*P−1) transmission time units.

In an implementation, step S1801 may include: determining, based on the parameter Q and a time domain period P of a grant-free resource, the grant-free transmission time unit used in the first transmission of the to-be-transmitted data.

In an implementation, step S1801 may specifically include the following steps:

S1801a. Determine a grant-free transmission time unit in a time domain resource.

S1801b. Determine, based on the parameter Q, whether the grant-free transmission time unit determined in step S1801a is the grant-free transmission time unit that can be used in the first transmission in the repeated transmissions, and if the grant-free transmission time unit determined in step S1801a is not the grant-free transmission time unit that can be used in the first transmission in the repeated transmissions, continue to perform step S1801a to determine a next grant-free transmission time unit, and then perform step S1801 until the grant-free transmission time unit that can be used in the first transmission in the repeated transmissions is found.

In an implementation, in step S1801a, transmission time units in the time domain resource that are grant-free transmission time units may be determined based on the time domain period P of the grant-free resource. In another implementation, in step S1801a, transmission time units in the time domain resource that are grant-free transmission time units may be determined based on the period of the grant-free transmission time unit and a time domain location of the first grant-free transmission time unit.

FIG. 19 shows a determined time unit that can be used in the first transmission in the repeated transmissions according to this embodiment. In the figure, a solid-line box schematically shows a grant-free transmission time unit, and a slashed box schematically shows a grant-free transmission time unit that can be used in the first transmission in the repeated transmissions in the grant-free transmission time units.

In an implementation, the value of Q may be specifically a maximum quantity K of repeated transmissions, or the parameter Q may be specifically less than a maximum quantity of repeated transmissions.

In an implementation, the determining a grant-free transmission time unit that can be used in the first transmission in repeated transmissions in step S1801 may specifically include: determining, based on a sequence number (for example, "t+1" in FIG. 8) of the grant-free transmission time unit and the parameter Q, the grant-free transmission time unit used in the first transmission of the to-be-transmitted data. In a specific implementation, a formula (3a) or a formula (4a) may be used for determining.

The formula (3a) is GF_T_Index mod Q=0; and the formula (4a) is GF_T_Index mod Q=T_offset_value, where GF_T_Index is the sequence number of the grant-free transmission time unit determined in step S1801a, and T_offset_value is a preset time offset value, and may be configured by a network device and notified to the terminal device, or may be specified in a standard.

In another implementation, the determining a grant-free transmission time unit that can be used in the first transmission in repeated transmissions in step S1801 may specifically include: determining, based on an index (for example, "$n_{t+1}$" in FIG. 8) of the grant-free transmission time unit and the parameter Q, the grant-free transmission time unit used in the first transmission of the to-be-transmitted data. In a specific implementation, a formula (3b), a formula (4b), a formula (3c), or a formula (4c) may be used for determining.

The formula (3b) is (T_Index/P)mod Q=0;

the formula (3c) is ((T_Index−T_Index_Start)/P)mod Q=0;

the formula (4b) is (T_Index/P)mod Q=T_offset_value; and the formula (4c) is ((T_Index−T_Index_Start)/P)mod Q=T_offset_value, where T_Index is the index of the grant-free transmission time unit determined in step S1801a, T_offset_value is a preset time offset value, T_Index_Start is an index of the first grant-free transmission time unit that is configured by a base station for the terminal device, P is the time domain period of the grant-free resource, P is an integer greater than or equal to 1, and T_offset_value and T_Index_Start may be configured by the base station and notified to the terminal device, or may be pre-agreed on by the terminal device and the base station (for example, specified in a standard).

It should be noted that in implementation of the present invention, there is no limitation that step S1801 needs to be divided into two steps S1801a and S1801b for implementation.

In another implementation, step S1801 may specifically include: determining a transmission time unit whose index satisfies a formula (4d) as the grant-free transmission time that can be used in the first transmission in the repeated transmissions.

The formula (4d) is (T_index−T_Index_Start)mod (P*Q)=T_offset_value, where

T_index is the index of the transmission time unit, T_Index_Start is an index of the first grant-free transmission time unit, P is the time domain period of the grant-free resource, Q is the period of the grant-free transmission time unit, in grant-free transmission time units, that can be used in the repeated transmissions, T_offset_value is a preset time offset value, and a value of T_offset_value may be specifically one of 0, P, 1*P, . . . , or (Q−1)*P.

Step S1802: Determine, based on the determined grant-free transmission time unit and the parameter Q, a HARQ process used to transmit the to-be-transmitted data.

In an implementation, step S1802 may specifically include: determining a HARQ process number based on the sequence number (for example, "t+1" in FIG. 8) of the grant-free transmission time unit determined in step S1801, the parameter Q, and a maximum quantity of HARQ processes supported by a grant-free resource of the terminal device. In a specific implementation, the HARQ process number may be determined according to a formula (5a) or a formula (6a).

The formula (5a) is:

HARQ_ID=floor(*GF_T*_Index/*Q*)mod *N_GF*; and the formula (6a) is:

HARQ_ID=floor(*GF_T*_Index/*Q*)mod *N_GF*+*H*_offset_value, where floor( ) indicates rounding down, HARQ_ID is the HARQ process number, GF_T_Index is the sequence number of the grant-free transmission time unit, N_GF is the maximum quantity of HARQ processes supported by the grant-free resource of the terminal device, and H_offset_value is a preset process number offset value.

In another implementation, step S1802 may specifically include: determining the HARQ process number based on the index (for example, "$n_{t+1}$" in FIG. 8) of the grant-free transmission time unit determined in step S1801, the parameter Q, and a maximum quantity of supported HARQ processes. In a specific implementation, the HARQ process number may be determined according to a formula (7a) or a formula (8a).

The formula (7a) is:

HARQ_ID=floor(*T*_Index/(*P*Q*))mod *N_GF*; and the formula (8a) is:

HARQ_ID=floor(*T*_Index/(*P*Q*))mod *N_GF*+*H*_offset_value, where floor( ) indicates rounding down, HARQ_ID is the HARQ process number, T_Index is the index of the grant-free transmission time unit, N_GF is the maximum quantity of HARQ processes supported by a grant-free resource of the terminal device, H_offset_value is a preset process number offset value, P is the time domain period of the grant-free resource, and P is an integer greater than or equal to 1.

In this embodiment, P, Q, N_GF, T_Index_Start, T_offset_value, and H_offset_value may be predefined (for example, specified in a standard), may be specified by the network device and notified to the terminal device by using signaling, or may be determined through negotiation between the network device and the terminal device. In an implementation, some of the parameters may be specified by the network device, and the other parameters may be specified in a standard, or all of the parameters may be specified by the network device, or all of the parameters may be specified in a standard. This is not limited in this application.

When H_offset_value is specified by the network device, the network device may add P, N_GF, H_offset_value, and the parameter Q to a same piece of signaling for sending to the terminal device, or may add P, N_GF, H_offset_value, and the parameter Q to different pieces of signaling for sending to the terminal device.

When the grant-free resource configured by the network device for the terminal device includes a plurality of frequency resources, and a parameter Q is specified for each frequency resource, a HARQ process number corresponding to each frequency resource in a grant-free transmission time unit GF_T_Index (or T_index) is calculated by using any one of the formulas (5a) to (8a) based on the parameter Q corresponding to each frequency resource. When the HARQ process number corresponding to each frequency resource is calculated by using the formula (6a) or (8a), different frequency resources may correspond to different preset process number offset values H_offset_value. H_offset_value corresponding to each frequency resource may be predefined (for example, specified in a standard), may be specified by the network device and notified to the terminal device by using signaling, or may be determined through negotiation between the terminal device and the network device. When H_offset_value is specified by the network device, the network device may add H_offset_value corresponding to each frequency resource and the parameter Q to a same piece of signaling for sending to the terminal device, or may add H_offset_value corresponding to each frequency resource to another piece of signaling for sending to the terminal device. In another embodiment, the network device may specify a parameter Q for a grant-free resource including a plurality of frequency resources. When the network device configures a plurality of sets of grant-free resources for the terminal device, the network device may further specify a parameter Q, H_offset_value, and N_GF for each set of grant-free resources. The terminal device may select one set of grant-free resources from the plurality of sets of grant-free resources for repeated transmissions of the to-be-transmitted data, and calculate a HARQ process number corresponding to a grant-free transmission time unit GF_T_Index (or T_index) in the set of grant-free resources by using any one of the foregoing formulas (5) to (8) based on a parameter Q, H_offset_value, and N_GF corresponding to the set of grant-free resources.

Step S1803: Perform, by using the HARQ process determined in step S1802, the first transmission of the to-be-transmitted data in the grant-free transmission time unit determined in step S1801.

In this embodiment, after the terminal device performs the first transmission of the to-be-transmitted data in the grant-free transmission time unit determined in step S1801, the terminal device may perform, by using the HARQ process determined in S1802, another transmission in the repeated transmissions of the to-be-transmitted data in a grant-free transmission time unit after the grant-free transmission time unit determined in step S1801, and terminate the repeated transmissions of the to-be-transmitted data when a termination condition is satisfied. Each transmission of the to-be-transmitted data is performed in a grant-free transmission time unit, and a grant-free resource configured for the terminal device in the grant-free transmission time unit is used. When a plurality of grant-free resources are configured in one grant-free transmission time unit, the terminal device may select one or more grant-free resources from the plurality of grant-free resources, or even select all of the grant-free resources configured for the terminal device in the grant-free transmission time unit, to transmit the to-be-transmitted data.

In an implementation, the termination condition includes at least one of the following conditions:

a termination condition A: The terminal device receives an ACK fed back by the network device for the to-be-transmitted data sent by the terminal device;

a termination condition B: The terminal device receives, after performing a specific transmission (not the last transmission) in the repeated transmissions, an uplink grant sent by the network device for the to-be-transmitted data sent by the terminal device; and a termination condition C: The maximum quantity of repeated transmissions is reached.

In the repeated transmissions, one redundancy version of the to-be-transmitted data may be transmitted each time, and redundancy versions in different transmissions may be the same or different.

In an implementation, a redundancy version is associated with a grant-free transmission time unit. To be specific, in a grant-free transmission time unit, the terminal device can send only a redundancy version related to the grant-free transmission time unit, and cannot send another version. In this embodiment, the method shown in FIG. 18 may further include: determining a redundancy version of the to-be-transmitted data in each transmission based on an index of a grant-free transmission time unit in which each transmission in the repeated transmissions is performed or based on a sequence number of a grant-free transmission time unit in which each transmission in the repeated transmissions is performed. Because the redundancy version is associated with the grant-free transmission time unit, the network device can accurately learn of redundancy version information of received data based on only a grant-free transmission time unit in which the data is received. An association relationship between a redundancy version and a grant-free transmission time unit may be predefined (for example, specified in a standard), or may be specified by the network device and notified to the terminal device by using signaling. The network device may add the association relationship between the redundancy version and the grant-free transmission time unit and the parameter Q to a same piece of signaling for sending to the terminal device, or may add the association relationship between the redundancy version and the grant-free transmission time unit to another piece of signaling for sending to the terminal device.

In the method provided in the embodiment shown in FIG. 18, resources can be bound by using the parameter Q. The Q bound grant-free transmission time units are used in a plurality of repeated transmissions of a same data packet. The first grant-free transmission time unit in the Q bound grant-free transmission time units is used in the first repeated transmission of the data packet. In this way, when detecting an uplink data packet of a terminal in any one of the Q bound grant-free transmission time units, the network device can very easily determine a grant-free transmission time unit in which the first transmission of the data packet is performed. Therefore, that processing performed when the network device receives data transmitted by using a repeated transmission mechanism becomes simple.

In another embodiment, the device shown in FIG. 12 may be configured to perform the method provided in the embodiment shown in FIG. 18. It should be noted that in this embodiment, the device shown in FIG. 12 may not need to perform the method in the embodiment shown in FIG. 18, or may not need to perform a method in another embodiment in this application.

The processing unit 1201 is configured to determine, based on a parameter Q, a grant-free transmission time unit used in the first transmission of to-be-transmitted data, where Q is a period of a grant-free transmission time unit, in grant-free transmission time units, that can be used in the first transmission in repeated transmissions, and a value of Q is greater than or equal to 1.

The HARQ process determining unit 1202 is configured to determine, based on the determined grant-free transmission time unit and the parameter Q, a hybrid automatic repeat request HARQ process used to transmit the to-be-transmitted data.

The transmission unit 1203 is configured to perform the first transmission of the to-be-transmitted data by using the determined HARQ process in the determined grant-free transmission time unit.

In this embodiment, for specific implementation of the processing unit 1201, refer to step S1801 and the related part thereof in the embodiment shown in FIG. 18; for specific implementation of the HARQ process determining unit 1202, refer to step S1802 and the related part thereof in the embodiment shown in FIG. 18; and for specific implementation of the transmission unit 1203, refer to step S1803 and the related part thereof in the embodiment shown in FIG. 18.

In another embodiment, the terminal device of the structure shown in FIG. 13 may be configured to perform the method provided in the embodiment shown in FIG. 18. It should be noted that in this embodiment, the terminal device shown in FIG. 13 may not need to perform the method in the embodiment shown in FIG. 18, or may not need to perform a method in another embodiment in this application. The transceiver 1303 is configured to: receive data sent by a network device and various types of signaling in the foregoing embodiments, and is further configured to send the to-be-transmitted data in the foregoing embodiments. For example, the transceiver 1303 is configured to send the to-be-transmitted data in step S1803 in the embodiment shown in FIG. 18. The processor 1301 is configured to execute program code stored in the memory 1302, and when the program code is executed, the processor 1301 is configured to perform step S1801 and step S1802 in the embodiment shown in FIG. 18.

For the to-be-transmitted data sent by using the method for repeated transmission in the embodiment shown in FIG. 18, the network device may also use the method described in the embodiment shown in FIG. 18 when determining a time unit in which the first transmission in repeated transmissions is performed and a HARQ process used to transmit the to-be-transmitted data. Details are not described herein again.

This application further provides the following embodiments:

Embodiment 1

A method for repeated transmission, where the method includes:

determining, by a terminal device, a grant-free transmission time unit used in the first transmission of to-be-transmitted data, where the grant-free transmission time unit is a transmission time unit in which a grant-free resource is configured for the terminal device;

determining, by the terminal device based on the determined grant-free transmission time unit and a parameter Q, a HARQ process used to transmit the to-be-transmitted data, where a value of Q is an integer greater than or equal to 1; and when repeated transmission of the to-be-transmitted data is not terminated before the first specific grant-free transmission time unit after the determined grant-free transmission time unit, performing, by the terminal device starting from the determined grant-free transmission time unit by using the HARQ process, one transmission of the to-be-transmitted data on a grant-free resource configured for the terminal device in each grant-free transmission time unit until the last transmission of the to-be-transmitted data is performed in the first specific grant-free transmission time unit, where the specific grant-free transmission time unit is specifically a grant-free transmission time unit periodically appearing in grant-free transmission time units, and a period of the specific grant-free transmission time unit is Q.

Embodiment 2

The method according to Embodiment 1, where the parameter Q is specifically a maximum quantity of repeated transmissions.

Embodiment 3

The method according to Embodiment 1, where a value of the parameter Q is less than a maximum quantity of repeated transmissions.

Embodiment 4

The method according to any one of Embodiment 1 to Embodiment 3, where the method further includes:
receiving, by the terminal device, information that carries the parameter Q and that is sent by a network device, and obtaining the parameter Q from the information carrying the parameter Q.

Embodiment 5

The method according to any one of Embodiment 1 to Embodiment 4, where the determining, by the terminal device based on the determined grant-free transmission time unit and a parameter Q, a HARQ process used to transmit the to-be-transmitted data includes:
determining a HARQ process number based on a sequence number of the determined grant-free transmission time unit, the parameter Q, and a maximum quantity of HARQ processes supported by a grant-free resource of the terminal device.

Embodiment 6

The method according to Embodiment 5, where the determining a HARQ process number based on a sequence number of the determined grant-free transmission time unit, the parameter Q, and a maximum quantity of HARQ processes supported by a grant-free resource of the terminal device includes:
determining the HARQ process number according to a third formula or a fourth formula, where
the third formula is:

$HARQ\_ID=\text{floor}(GF\_T\_Index/Q) \bmod N\_GF$; and the fourth formula is:

$HARQ\_ID=\text{floor}(GF\_T\_Index/Q) \bmod N\_GF+H\_\text{offset\_value}$, where floor( ) indicates rounding down, HARQ_ID is the HARQ process number, GF_T_Index is the sequence number of the grant-free transmission time unit, N_GF is the maximum quantity of HARQ processes supported by the grant-free resource of the terminal device, and H_offset_value is a preset process number offset value.

Embodiment 7

The method according to any one of Embodiment 1 to Embodiment 4, where the determining, by the terminal device based on the determined grant-free transmission time unit and a parameter Q, a HARQ process used to transmit the to-be-transmitted data includes:
determining, based on an index of the determined grant-free transmission time unit, the parameter Q, and a maximum quantity of HARQ processes supported by a grant-free resource of the terminal device, a number of the HARQ process used to transmit the to-be-transmitted data.

Embodiment 8

The method according to Embodiment 7, where the determining, based on an index of the determined grant-free transmission time unit, the parameter Q, and a maximum quantity of HARQ processes supported by a grant-free resource of the terminal device, a number of the HARQ process used to transmit the to-be-transmitted data includes:
determining the number of the HARQ process according to a fifth formula or a sixth formula, where
the fifth formula is:

$HARQ\_ID=\text{floor}(T\_Index/(P*Q)) \bmod N\_GF$; and the sixth formula is:

$HARQ\_ID=\text{floor}(T\_Index/(P*Q)) \bmod N\_GF+H\_\text{offset\_value}$, where floor( ) indicates rounding down, HARQ_ID is the HARQ process number, T_Index is the index of the grant-free transmission time unit, N_GF is the maximum quantity of HARQ processes supported by the grant-free resource of the terminal device, H_offset_value is a preset process number offset value, P is a time domain period of the grant-free resource of the terminal device, and P is an integer greater than or equal to 1.

Embodiment 9

The method according to any one of Embodiment 1 to Embodiment 8, where the method further includes:
determining, by the terminal device, whether a current grant-free transmission time unit is the first specific grant-free transmission time unit.

Embodiment 10

The method according to Embodiment 9, where the determining, by the terminal device, whether a current grant-free transmission time unit is the first specific grant-free transmission time unit includes:
when a value obtained by performing a modulo Q operation on a sequence number of the current grant-free transmission time unit is equal to 0 or a preset time offset value, the current grant-free transmission time unit is the specific grant-free transmission time unit.

Embodiment 11

The method according to any one of Embodiment 1 to Embodiment 10, where the method further includes:

determining a redundancy version of the to-be-transmitted data in each transmission based on a sequence number of a grant-free transmission time unit in which each transmission in repeated transmissions is performed.

Embodiment 12

The method according to any one of Embodiment 1 to Embodiment 11, where the method further includes:
determining, based on the sequence number of the grant-free transmission time unit in which each transmission in the repeated transmissions is performed, an MCS that needs to be used in each transmission.

Embodiment 13

A terminal device, where the terminal device includes:
a processing unit, configured to determine a grant-free transmission time unit used in the first transmission of to-be-transmitted data, where the grant-free transmission time unit is a transmission time unit in which a grant-free resource is configured for the terminal device;
a HARQ process determining unit, configured to determine, based on the determined grant-free transmission time unit and a parameter Q, a HARQ process used to transmit the to-be-transmitted data, where a value of Q is an integer greater than or equal to 1; and
a transmission unit, configured to: when repeated transmission of the to-be-transmitted data is not terminated before the first specific grant-free transmission time unit after the determined grant-free transmission time unit, perform, starting from the determined grant-free transmission time unit by using the HARQ process, one transmission of the to-be-transmitted data on a grant-free transmission resource configured for the terminal device in each grant-free transmission time unit until the last transmission of the to-be-transmitted data is performed in the first specific grant-free transmission time unit, where the specific grant-free transmission time unit is specifically a grant-free transmission time unit periodically appearing in grant-free transmission time units, and a period of the specific grant-free transmission time unit is Q.

Embodiment 14

The terminal device according to Embodiment 13, where the parameter Q is specifically a maximum quantity of repeated transmissions.

Embodiment 15

The terminal device according to Embodiment 13, where the value of the parameter Q is less than a maximum quantity of repeated transmissions.

Embodiment 16

The terminal device according to any one of Embodiment 13 to Embodiment 15, where the terminal device further includes:
a receiving unit, configured to: receive information that carries the parameter Q and that is sent by a network device, and obtain the parameter Q from the information carrying the parameter Q.

Embodiment 17

The terminal device according to any one of Embodiment 13 to Embodiment 16, where the HARQ process determining unit is specifically configured to:
determine a HARQ process number based on a sequence number of the determined grant-free transmission time unit, the parameter Q, and a maximum quantity of HARQ processes supported by a grant-free resource of the terminal device.

Embodiment 18

The terminal device according to Embodiment 17, where the determining a HARQ process number based on a sequence number of the determined grant-free transmission time unit, the parameter Q, and a maximum quantity of HARQ processes supported by a grant-free resource of the terminal device includes:
determining the HARQ process number according to a third formula or a fourth formula, where
the third formula is:

$$HARQ\_ID=floor(GF\_T\_Index/Q) \bmod N\_GF; \text{ and}$$

the fourth formula is:

$$HARQ\_ID=floor(GF\_T\_Index/Q) \bmod N\_GF+H\_offset\_value, \text{ where}$$

floor( ) indicates rounding down, HARQ_ID is the HARQ process number, GF_T_Index is the sequence number of the grant-free transmission time unit, N_GF is the maximum quantity of HARQ processes supported by the grant-free resource of the terminal device, and H_offset_value is a preset process number offset value.

Embodiment 19

The terminal device according to any one of Embodiment 13 to Embodiment 16, where the HARQ process determining unit is specifically configured to:
determine, based on an index of the determined grant-free transmission time unit, the parameter Q, and a maximum quantity of HARQ processes supported by a grant-free resource of the terminal device, a number of the HARQ process used to transmit the to-be-transmitted data.

Embodiment 20

The terminal device according to Embodiment 19, where the determining, based on an index of the determined grant-free transmission time unit, the parameter Q, and a maximum quantity of HARQ processes supported by a grant-free resource of the terminal device, a number of the HARQ process used to transmit the to-be-transmitted data includes:
determining the number of the HARQ process according to a fifth formula or a sixth formula, where
the fifth formula is:

$$HARQ\_ID=floor(T\_Index/(P*Q)) \bmod N\_GF; \text{ and}$$

the sixth formula is:

$$HARQ\_ID=floor(T\_Index/(P*Q)) \bmod N\_GF+H\_offset\_value, \text{ where}$$

floor( ) indicates rounding down, HARQ_ID is the HARQ process number, T_Index is the index of the grant-free transmission time unit, N_GF is the maximum quantity of HARQ processes supported by the grant-free resource of the terminal device, H_offset_value is a preset process number offset value, P is a time domain period of the grant-free resource, and P is an integer greater than or equal to 1.

Embodiment 21

The terminal device according to any one of Embodiment 13 to Embodiment 20, where the processing unit is further configured to:
determine whether a current grant-free transmission time unit is the first specific grant-free transmission time unit.

Embodiment 22

The terminal device according to Embodiment 21, where the determining whether a current grant-free transmission time unit is the first specific grant-free transmission time unit includes:
when a value obtained by performing a modulo Q operation on a sequence number of the current grant-free transmission time unit in transmission units in which grant-free resource are configured is equal to 0 or a preset time offset value, the current grant-free transmission time unit is the specific grant-free transmission time unit.

Embodiment 23

The terminal device according to any one of Embodiment 13 to Embodiment 22, where the processing unit is further configured to:
determine a redundancy version of the to-be-transmitted data in each transmission based on a sequence number of a grant-free transmission time unit in which each transmission in repeated transmissions is performed.

Embodiment 24

The terminal device according to any one of Embodiment 13 to Embodiment 23, where the processing unit is further configured to:
determine, based on the sequence number of the grant-free transmission time unit in which each transmission in the repeated transmissions is performed, an MCS that needs to be used in each transmission.

In the foregoing embodiments, object data in uplink transmission is used as an example to describe the solutions in the present invention. It may be understood that the solutions provided in the foregoing embodiments are also applicable to a scenario in which an object in uplink transmission is uplink control information.

When the network device or the terminal device is a chip, the network device or the terminal device may be a field programmable gate array, an application-specific integrated chip, a system chip, a central processing unit, a network processor, a digital signal processing circuit, or a microcontroller for implementing a related function, or may be a programmable controller or another integrated chip.

All or some of these chips may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A method for repeated transmission, comprising:
determining, by a terminal device, a target transmission time unit, wherein the target transmission time unit is one of multiple transmission time units and is configured with a grant free transmission resource, wherein the multiple transmission time units are located between two adjacent specific transmission time units, wherein, between the two adjacent specific transmission time units, the target transmission time unit is not a first transmission time unit configured with a grant-free transmission resource, wherein a period of the specific transmission time unit in a time domain resource is a parameter Q transmission time units, and wherein the parameter Q is an integer greater than 1;
determining, by the terminal device based on the target transmission time unit and the parameter Q, a hybrid automatic repeat request (HARQ) process used to transmit a data packet; and
when repeated transmission of the data packet is not terminated before a latter specific transmission time unit in the two adjacent specific transmission time units, performing, by the terminal device starting from the target transmission time unit by using the HARQ process, one transmission of the data packet in a transmission time unit configured with the grant-free transmission resource until the last transmission of the data packet is performed in the latter specific transmission time unit.

2. The method according to claim 1, wherein the method further comprises:
receiving, by the terminal device, information that carries the parameter Q and that is sent by a network device; and
obtaining a value of the parameter Q from the information carrying the parameter Q.

3. The method according to claim 1, wherein the determining,
by the terminal device based on the target transmission time unit and the parameter Q, the HARQ process used to transmit the data packet comprises:
determining a HARQ process number based on an index of the target transmission time unit, the parameter Q, and a maximum quantity of supported HARQ processes.

4. The method according to claim 3, wherein the determining the HARQ process number based on an index of the target transmission time unit, the parameter Q, and a maximum quantity of supported HARQ processes comprises:

determining the HARQ process number according to a first formula or a second formula, wherein:

the first formula is:

$$HARQ\_ID = \text{floor}(T\_Index/Q) \bmod N; \text{ and}$$

the second formula is:

$$HARQ\_ID = \text{floor}(T\_Index/Q) \bmod N + H\_offset\_value,$$

and wherein floor( ) indicates rounding down, HARQ_ID is the HARQ process number, T_Index is the index of the target transmission time unit, N is the maximum quantity of supported HARQ processes, and H_offset_value is a preset process number offset value.

5. The method according to claim 1, wherein the method further comprises:

before performing each repeated transmission of the data packet, determining, by the terminal device, whether a current transmission time unit is the latter specific time unit.

6. The method according to claim 1, wherein the method further comprises:

determining a redundancy version of the data packet in each transmission based on an index or a sequence number of a transmission time unit in which each transmission in repeated transmissions is performed.

7. The method according to claim 6, wherein the method further comprises:

receiving redundancy version information that is associated with each transmission time unit configured with the grant free transmission resource and that is sent by the network device; and wherein the determining the redundancy version of the data packet in each transmission based on the index or the sequence number of the transmission time unit in which each transmission in repeated transmissions is performed comprises:

determining the redundancy version of the data packet in each transmission based on the received redundancy version information and the index or the sequence number of the transmission time unit in which each transmission in the repeated transmissions is performed.

8. A terminal device, comprising:

a processor; and a transmitter coupled with the processor;

wherein the processor is configured to:

determine a target transmission time unit, wherein the target transmission time unit is one of multiple transmission time units and is configured with a grant free transmission resource, the multiple transmission time units are located between two adjacent specific transmission time units; wherein between the two adjacent specific transmission time units, the target transmission time unit is not a first transmission time unit configured with a grant-free transmission resource; wherein a period of the specific transmission time unit in a time domain resource is a parameter Q transmission time units, and the parameter Q is an integer greater than 1;

determine, based on the target transmission time unit and the parameter Q, a hybrid automatic repeat request (HARQ) process used to transmit a data packet; and wherein the transmitter is configured to:

when repeated transmission of the data packet is not terminated before the latter specific transmission time unit in the two adjacent specific transmission time units, perform, starting from the target transmission time unit by using the HARQ process, one transmission of the data packet in a transmission time unit configured with the grant-free transmission resource until the last transmission of the data packet is performed in the latter specific transmission time unit.

9. The terminal device according to claim 8, wherein the terminal device further comprises:

a receiver coupled to the processor, wherein the receiver is configured to: receive information that carries the parameter Q and that is sent by a network device; and obtain the parameter Q from the information carrying the parameter Q.

10. The terminal device according to claim 8, wherein the processor is further configured to:

determine a HARQ process number based on an index of the target transmission time unit, the parameter Q, and a maximum quantity of supported HARQ processes.

11. The terminal device according to claim 10, wherein the determining the HARQ process number based on the index of the target-transmission time unit, the parameter Q, and the maximum quantity of supported HARQ processes comprises:

determining the HARQ process number according to a first formula or a second formula, wherein:

the first formula is:

$$HARQ\_ID = \text{floor}(T\_Index/Q) \bmod N; \text{ and}$$

the second formula is:

$$HARQ\_ID = \text{floor}(T\_Index/Q) \bmod N + H\_offset\_value,$$

and wherein floor( ) indicates rounding down, HARQ_ID is the HARQ process number, T_Index is the index of the target transmission time unit, N is the maximum quantity of supported HARQ processes, and H_offset_value is a preset process number offset value.

12. The terminal device according to claim 8, wherein the processor is further configured to:

before each repeated transmission of the data packet is performed, determine whether a current transmission time unit is the latter specific transmission time unit.

13. The terminal device according to claim 8, wherein the processor is further configured to:

determine a redundancy version of the data packet in each transmission based on an index or a sequence number of a transmission time unit in which each transmission in repeated transmissions is performed.

14. The terminal device according to claim 8, wherein the terminal device further comprises:

a second receiver configured to receive redundancy version information that is associated with each transmission time unit configured with a grant free resource and that is sent by the network device; and wherein the processor is configured to determine the redundancy version of the data packet in each transmission based on the received redundancy version information and the index or a sequence number of the transmission time unit in which each transmission in the repeated transmissions is performed.

15. A non-transitory computer readable storage medium storing a computer program, and when the computer program is run on a computer, the computer is enabled to perform a method comprising:

determining a target transmission time unit, wherein the target transmission time unit is one of multiple transmission time units and is configured with a grant free transmission resource, the multiple transmission time units are located between two adjacent specific transmission time units; wherein between the two adjacent specific transmission time units, the target transmission time unit is not a first transmission time unit configured with a grant-free transmission resource; wherein a period of the specific transmission time unit in a time domain resource is a parameter Q transmission time units, and the parameter Q is an integer greater than 1;
determining, based on the target transmission time unit and the parameter Q, a hybrid automatic repeat request (HARQ) process used to transmit a data packet; and
when repeated transmission of the data packet is not terminated before a latter specific transmission time unit in the two adjacent specific transmission time units, performing, by the terminal device starting from the target transmission time unit by using the HARQ process, one transmission of the data packet in a transmission time unit configured with the grant-free transmission resource until the last transmission of the data packet is performed in the latter specific transmission time unit.

16. The computer readable storage medium according to claim 15, wherein the method further comprises:
receiving information that carries the parameter Q and that is sent by a network device; and
obtaining a value of the parameter Q from the information carrying the parameter Q.

17. The computer readable storage medium according to claim 15,
wherein the determining, based on the target transmission time unit and the parameter Q, the HARQ process used to transmit the data packet comprises:
determining a HARQ process number based on an index of the target transmission time unit, the parameter Q, and a maximum quantity of supported HARQ processes.

18. The method according to claim 15, wherein the method further comprises:
determining a redundancy version of the data packet in each transmission based on an index or a sequence number of a transmission time unit in which each transmission in repeated transmissions is performed.

\* \* \* \* \*